United States Patent
Watanabe et al.

(10) Patent No.: US 12,372,197 B2
(45) Date of Patent: Jul. 29, 2025

(54) MOUNTING TOOL FOR HOLDING ELEVATOR ROPE TENSION MEASURING DEVICE

(71) Applicants: Mitsubishi Electric Building Solutions Corporation, Tokyo (JP); Mitsubishi Electric Corporation, Tokyo (JP)

(72) Inventors: Kotaro Watanabe, Tokyo (JP); Tetsuro Seki, Tokyo (JP); Sunao Fujiwara, Tokyo (JP); Yoshiko Ono, Tokyo (JP); Tetsushi Morikawa, Tokyo (JP); Takuya Hashiguchi, Tokyo (JP); Hiroshi Fukunaga, Tokyo (JP); Yasuyuki Koide, Tokyo (JP)

(73) Assignees: MITSUBISHI ELECTRIC BUILDING SOLUTIONS CORPORATION, Tokyo (JP); MITSUBISHI ELECTRIC CORPORATION, Tokyo (JP)

( * ) Notice: Subject to any disclaimer, the term of this patent is extended or adjusted under 35 U.S.C. 154(b) by 292 days.

(21) Appl. No.: 17/762,084

(22) PCT Filed: Jul. 3, 2020

(86) PCT No.: PCT/JP2020/026235
§ 371 (c)(1),
(2) Date: Mar. 21, 2022

(87) PCT Pub. No.: WO2021/065132
PCT Pub. Date: Apr. 8, 2021

(65) Prior Publication Data
US 2022/0381397 A1 Dec. 1, 2022

(30) Foreign Application Priority Data
Sep. 30, 2019 (WO) .................. PCT/JP2019/038590

(51) Int. Cl.
*F16M 13/02* (2006.01)
*B66B 7/12* (2006.01)

(52) U.S. Cl.
CPC .......... *F16M 13/02* (2013.01); *B66B 7/1215* (2013.01)

(58) Field of Classification Search
CPC .... F16M 13/02; B66B 5/0087; B66B 5/0018; B66B 7/1215; G01L 5/042
See application file for complete search history.

(56) References Cited

U.S. PATENT DOCUMENTS 2,735,728 A    2/1956  Powell
5,731,528 A *  3/1998  Yamazaki ............... G01L 5/042
                                                  73/862.41

(Continued)

FOREIGN PATENT DOCUMENTS

JP    9-257610 A    10/1997
JP    2001-31345 A   2/2001

(Continued)

OTHER PUBLICATIONS

International Search Report and Written Opinion mailed on Sep. 1, 2020, received for PCT Application PCT/JP2020/026235, Filed on Jul. 3, 2020, 15 pages including English Translation.

(Continued)

*Primary Examiner* — Bradley Duckworth
(74) *Attorney, Agent, or Firm* — XSENSUS LLP

(57) ABSTRACT

There is provided a mounting tool for an elevator rope tension measurement device, the mounting tool being capable of preventing the rope tension measurement device from interfering with a rope disposed adjacently to a rope that is a measurement target. A mounting tool for an elevator rope tension measurement device includes: a first holding body configured to hold a rope of an elevator; a second (Continued)

holding body configured to hold a rope tension measurement device that measures a tension of the rope; and a connecting body configured to connect the first holding body with the second holding body so as to dispose the rope tension measurement device at a position away from the rope.

13 Claims, 31 Drawing Sheets

(56) References Cited

U.S. PATENT DOCUMENTS

2014/0042285 A1 2/2014 Carnevali
2017/0343434 A1 11/2017 Breite et al.

FOREIGN PATENT DOCUMENTS

| JP | 2010-66237 A | 3/2010 |
| JP | 2013-177107 A | 9/2013 |
| KR | 20-0373413 Y1 | 1/2005 |
| WO | 2019/138547 A1 | 7/2019 |

OTHER PUBLICATIONS

Office Action dated Nov. 27, 2023 in the corresponding Taiwanese patent application No. 109130907.
Office Action issued on May 17, 2022, in corresponding Indian patent Application No. 202247016578, 5 pages.
Office Action issued Nov. 1, 2023 in corresponding Singaporean Patent Application No. 11202202963Y, 8 pages.
Korean Office Action issued Nov. 16, 2023, in corresponding Korean Patent Application No. 10-2022-7011798, 9 pages.

* cited by examiner

MOUNTING TOOL FOR HOLDING ELEVATOR ROPE TENSION MEASURING DEVICE

CROSS-REFERENCE TO RELATED APPLICATIONS

The present application is based on PCT filing PCT/JP2020/026235, filed Jul. 3, 2020, which claims priority to PCT/JP2019/038590, filed Sep. 30, 2019, the entire contents of each are incorporated herein by reference.

FIELD

The present disclosure relates to a mounting tool for holding an elevator rope tension measurement device.

BACKGROUND

PTL 1 discloses a mounting tool for an elevator rope tension measurement device. With the mounting tool, it is possible to mount a sensor to a rope.

CITATION LIST

Patent Literature

[PTL 1] JP 9-257610 A

SUMMARY

Technical Problem

However, when a large-sized sensor is mounted to a measurement target with the mounting tool described in PTL 1, the sensor may interfere with a rope disposed adjacently to a rope that is the measurement target. In this case, the tension of the rope cannot be measured accurately.

The present disclosure has been made to solve the above-mentioned problem, and it is an object of the present invention to provide a mounting tool for an elevator rope tension measurement device, the mounting tool being capable of preventing the rope tension measurement device from interfering with the rope disposed adjacently to the rope that is the measurement target.

Solution to Problem

A mounting tool for an elevator rope tension measurement device according to the present disclosure includes: a first holding body configured to hold a rope of an elevator; a second holding body configured to hold a rope tension measurement device that measures a tension of the rope; and a connecting body configured to connect the first holding body with the second holding body so as to dispose the rope tension measurement device at a position away from the rope.

Advantageous Effects of Invention

According to the present disclosure, the connecting body connects the first holding body with the second holding body so as to dispose the rope tension measurement device at a position away from the rope. Therefore, it is possible to prevent the rope tension measurement device from interfering with a rope disposed adjacently to the rope that is a measurement target.

DESCRIPTION OF EMBODIMENTS

Embodiments will be described with reference to attached drawings. In the respective drawings, identical or corresponding components are given the same reference symbols. The repeated description of such components will be simplified or omitted when appropriate.

Embodiment 1

Figure 1:
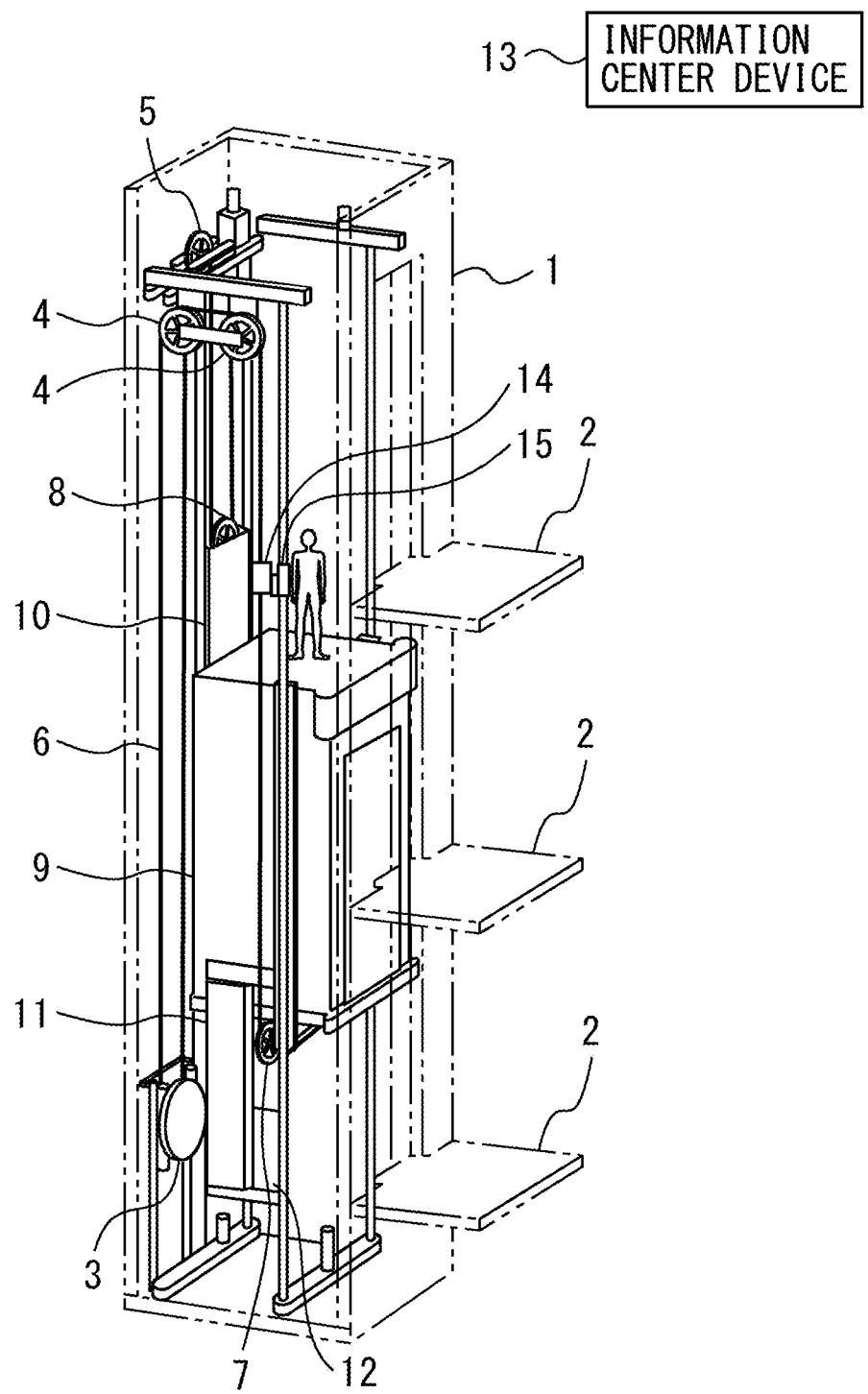
FIG. 1 is a configuration diagram of an elevator system in which an elevator rope tension measurement system of an embodiment 1 is used.

FIG. 1 is a configuration diagram of an elevator system in which an elevator rope tension measurement system of an embodiment 1 is used.

In the elevator system shown in FIG. 1, a hoistway 1 penetrates through respective floors of a building not shown in the drawing. A plurality of halls 2 are provided to respective floors of the building. Each of the plurality of halls 2 faces the hoistway 1.

A traction machine 3 is provided at the lower portion of the hoistway 1. A pair of car-side return sheaves 4 are provided at the upper portion of the hoistway 1. A counterweight-side return sheave 5 is provided at the upper portion of the hoistway 1.

A plurality of ropes 6 are wound onto the traction machine 3, the pair of car-side return sheaves 4, and the counterweight-side return sheave 5. Both end portions of the plurality of ropes 6 are fixed to the upper portion of the hoistway 1. In FIG. 1, only one rope 6 is shown.

A pair of car-side suspension sheaves 7 are supported by the ropes 6 at a position closer to one end portion side of the ropes 6 than the pair of car-side return sheaves 4. In FIG. 1, only one car-side suspension sheave 7 is shown. A counterweight-side suspension sheave 8 is supported by the ropes 6 at a position closer to the other end portion side of the ropes 6 than the counterweight-side return sheave 5.

A car 9 is provided in the hoistway 1. The lower portion of the car 9 is supported by the pair of car-side suspension sheaves 7. A counterweight 10 is provided in the hoistway 1. The upper portion of the counterweight 10 is supported by the counterweight-side suspension sheave 8.

A control device 11 is provided at the lower portion of the hoistway 1. The control device 11 is electrically connected to the traction machine 3 and the like. The control device 11 is provided in such a manner that the control device 11 can perform overall control of the elevator.

A monitoring device 12 is provided at the lower portion of the hoistway 1. The monitoring device 12 is electrically connected to the control device 11. The monitoring device 12 is provided in such a manner that the monitoring device 12 can monitor a state of the elevator based on information from the control device 11.

An information center device 13 is provided to a place separated from the building provided with the elevator. For example, the information center device 13 may be provided to the maintenance company for the elevator. The information center device 13 is provided in such a manner that the information center device 13 can grasp the state of the elevator based on information from the monitoring device 12.

In adjusting dispersion of tension between the plurality of ropes 6, a worker utilizes the rope tension measurement system in a state where the worker is on the ceiling of the car 9. The rope tension measurement system includes a rope tension measurement device 14 and a mounting tool 15.

For example, the rope tension measurement device 14 may be a mobile terminal, such as a smartphone. The mounting tool 15 is mounted to the rope 6 that is a measurement target in a state of holding the rope tension measurement device 14.

In such a state, the worker applies vibration to the rope 6. At this point of operation, the rope tension measurement device 14 collects the vibration waveform data of the rope 6.

After the vibration waveform data of each of the plurality of ropes 6 is collected, the rope tension measurement device 14 calculates dispersion of tension between the plurality of ropes 6 based on the vibration waveform data of the plurality of ropes 6. The rope tension measurement device 14 indicates whether adjustment of the tension is necessary or not based on the dispersion of tension between the plurality of ropes 6.

The worker adjusts the tension of the rope 6 for which a necessity of adjustment is indicated.

Next, the rope tension measurement device 14 will be described with reference to FIG. 2.

Figure 2:
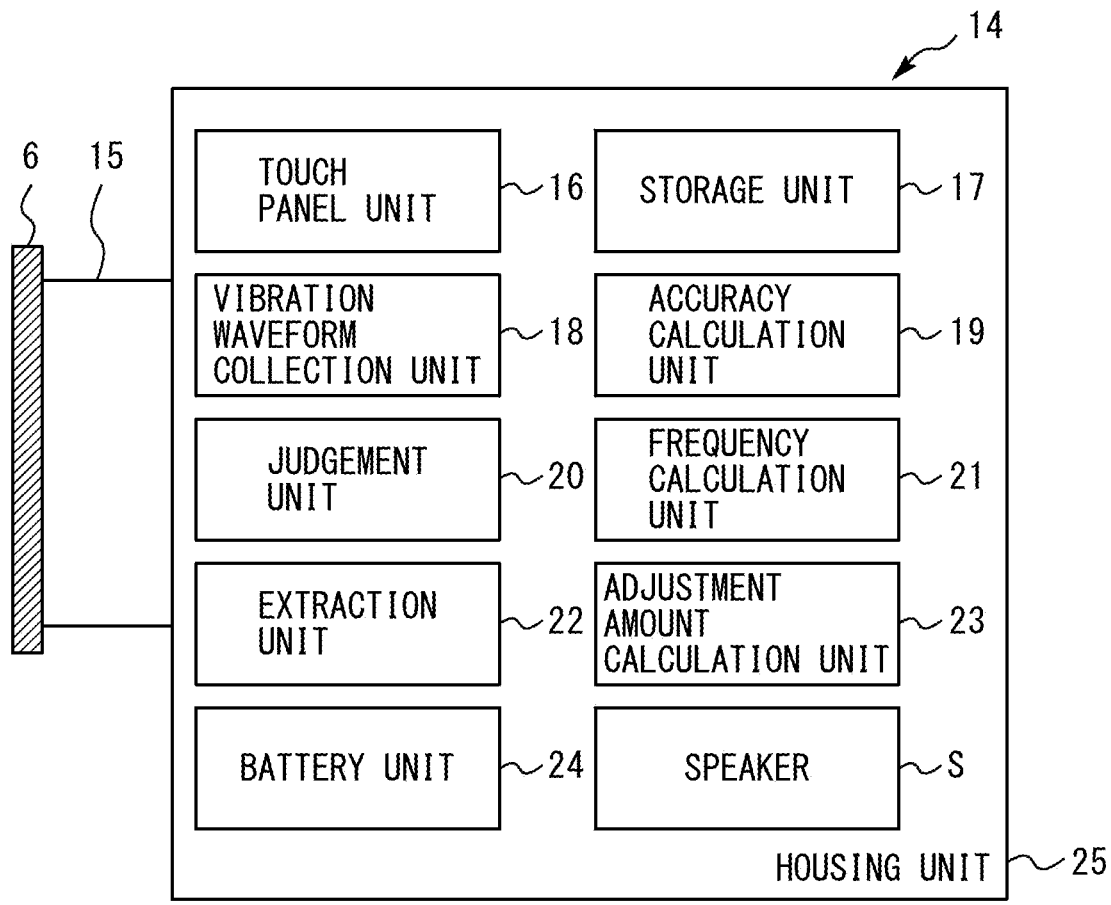
FIG. 2 is a block diagram of a rope tension measurement device utilized in the elevator rope tension measurement system of the embodiment 1.

FIG. 2 is a block diagram of the rope tension measurement device utilized in the elevator rope tension measurement system of the embodiment 1.

As shown in FIG. 2, the rope tension measurement device 14 includes a touch panel unit 16, a storage unit 17, a vibration waveform collection unit 18, an accuracy calculation unit 19, a judgement unit 20, a frequency calculation unit 21, an extraction unit 22, an adjustment amount calculation unit 23, a battery unit 24, and a housing unit 25. In the rope tension measurement device 14, at least one processor reads and executes a program stored in at least one memory to achieve respective functions of the respective units.

The touch panel unit 16 is provided in such a manner that the touch panel unit 16 can receive an external input operation. The touch panel unit 16 is provided in such a manner that the touch panel unit 16 can indicate information. The storage unit 17 is provided in such a manner that the storage unit 17 can store various pieces of information.

The vibration waveform collection unit 18 collects the vibration waveform data of the rope 6. For example, the vibration waveform collection unit 18 may be an acceleration sensor. In this case, the vibration waveform collection unit 18 has a function of an acceleration detection unit and a function of an acceleration collection unit. The acceleration detection unit has a function of detecting acceleration. The acceleration collection unit has a function of collecting the acceleration data detected by the acceleration detection unit. For example, based on information on the height of the hoistway 1 or the length of the ropes 6 that is externally inputted, the vibration waveform collection unit 18 sets a time period for collecting the vibration waveform data of the rope. For example, the vibration waveform collection unit 18 performs resampling processing on the collected vibration waveforms data.

In performing a pre-check, the accuracy calculation unit 19 calculates acceleration detection accuracy from information on acceleration collected by the vibration waveform collection unit 18. In performing the pre-check, the judgement unit 20 judges whether the tension of the rope 6 can be measured by the rope tension measurement device 14 based on the detection accuracy calculated by the accuracy calculation unit 19.

In measuring the tension of the rope 6, based on the measurement resolution calculated from the collection time period and collection cycles for collecting the vibration waveform data by the vibration waveform collection unit 18, the frequency calculation unit 21 selects a method for calculating the frequency of the vibration waveform collected by the vibration waveform collection unit 18. For example, the frequency calculation unit 21 calculates the frequency of a vibration waveform based on the calculation results of the autocorrelation function and the Fourier transform of the vibration waveform collected by the vibration waveform collection unit 18.

The extraction unit 22 calculates dispersion of tension between the respective ropes 6 from the information on the calculation results from the frequency calculation unit 21, and extracts the ropes 6 for which the tension is outside of designated values. The adjustment amount calculation unit 23 calculates the adjustment amount for the rope 6 extracted by the extraction unit 22.

The battery unit 24 supplies power to the touch panel unit 16, the storage unit 17, the vibration waveform collection unit 18, the frequency calculation unit 21, the extraction unit 22, and the adjustment amount calculation unit 23. The housing unit 25 forms an outer shell of the rope tension measurement device 14. The housing unit 25 houses the touch panel unit 16, the storage unit 17, the vibration waveform collection unit 18, the frequency calculation unit 21, the extraction unit 22, the adjustment amount calculation unit 23, and the battery unit 24.

Next, the first example of the pre-check of the rope tension measurement device 14 will be described with reference to FIG. 3 and FIG. 4.

Figure 3:
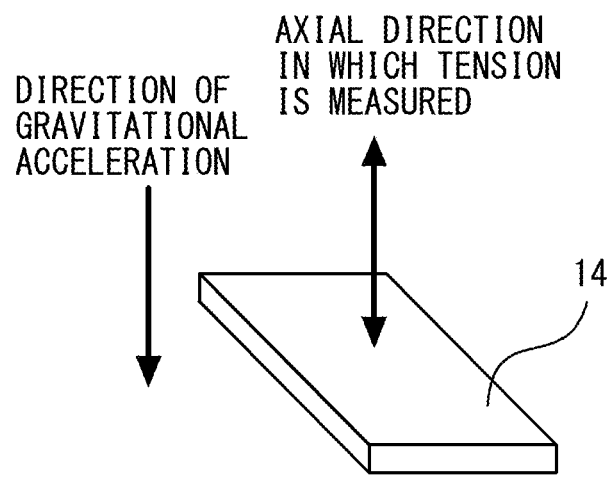
FIG. 3 is a perspective view of the rope tension measurement device utilized in the elevator rope tension measurement system of the embodiment 1.

FIG. 3 is a perspective view of the rope tension measurement device utilized in the elevator rope tension measurement system of the embodiment 1. FIG. 4 is a graph showing the detection result of acceleration detected by the rope tension measurement device utilized in the elevator rope tension measurement system of the embodiment 1.

As shown in FIG. 3, the rope tension measurement device 14 is maintained in a standstill state such that the axial direction of the vibration waveform collection unit 18 in which the tension of the rope 6 is measured is aligned with the direction of gravitational acceleration. In such a state, the vibration waveform collection unit 18 collects acceleration data during a certain time period.

Figure 4:
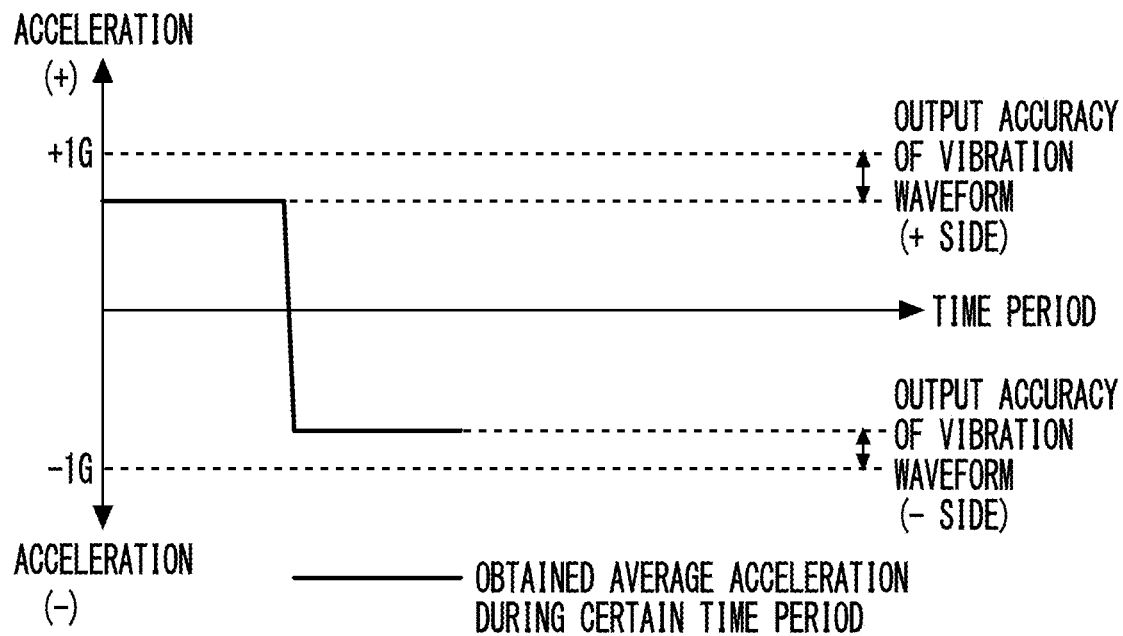
FIG. 4 is a graph showing the detection result of acceleration detected by the rope tension measurement device utilized in the elevator rope tension measurement system of the embodiment 1.

As shown in FIG. 4, the accuracy calculation unit 19 calculates a difference between the acceleration collected by the vibration waveform collection unit 18 and the gravitational acceleration. The judgement unit 20 judges whether the tension of the rope 6 can be measured by the rope tension measurement device 14 based on the difference calculated by the accuracy calculation unit 19. Specifically, the judgement unit 20 judges that the rope tension measurement device 14 can be utilized for the measurement of the tension of the rope 6 when the difference calculated by the accuracy calculation unit 19 is less than a threshold set in advance. The judgement unit 20 judges that the rope tension measurement device 14 cannot be utilized for the measurement of the tension of the rope 6 when the difference calculated by the accuracy calculation unit 19 is equal to or more than the threshold set in advance. Note that when acceleration on the + side and acceleration on the − side are collected by the vibration waveform collection unit 18 by inverting the rope tension measurement device 14, a judgement can also be made by using both the acceleration on the + side and the acceleration on the − side.

Next, the second example of the pre-check of the rope tension measurement device 14 will be described with reference to FIG. 5.

Figure 5:
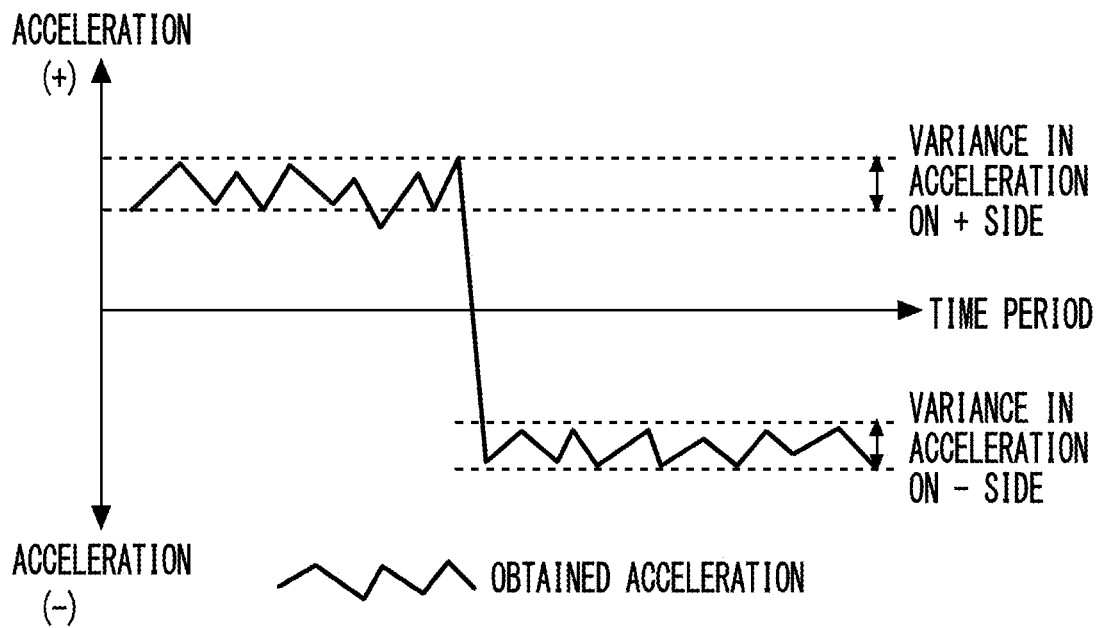
FIG. 5 is a graph showing the detection result of acceleration detected by the rope tension measurement device utilized in the elevator rope tension measurement system of the embodiment 1.

FIG. 5 is a graph showing the detection result of acceleration detected by the rope tension measurement device utilized in the elevator rope tension measurement system of the embodiment 1.

Also in the second example, in the same manner as the first example, the rope tension measurement device 14 is maintained in a standstill state such that the axial direction of the vibration waveform collection unit 18 in which the tension of the rope 6 is measured is aligned with the direction of gravitational acceleration. In such a state, the vibration waveform collection unit 18 collects acceleration data during a certain time period.

As shown in FIG. 5, the accuracy calculation unit 19 calculates the variance of acceleration collected by the vibration waveform collection unit 18. The judgement unit 20 judges whether the tension of the rope 6 can be measured by the rope tension measurement device 14 based on the variance calculated by the accuracy calculation unit 19. Specifically, the judgement unit 20 judges that the rope tension measurement device 14 can be utilized for the measurement of the tension of the rope 6 when the variance calculated by the accuracy calculation unit 19 is less than a threshold set in advance. The judgement unit 20 judges that the rope tension measurement device 14 cannot be utilized for the measurement of the tension of the rope 6 when the variance calculated by the accuracy calculation unit 19 is equal to or more than the threshold set in advance. Note that when acceleration on a + side and acceleration on a − side are collected by the vibration waveform collection unit 18 by inverting the rope tension measurement device 14, a judgement can also be made by using both the acceleration on the + side and acceleration on the − side.

Next, the third example of the pre-check of the rope tension measurement device 14 will be described with reference to FIG. 6.

Figure 6:
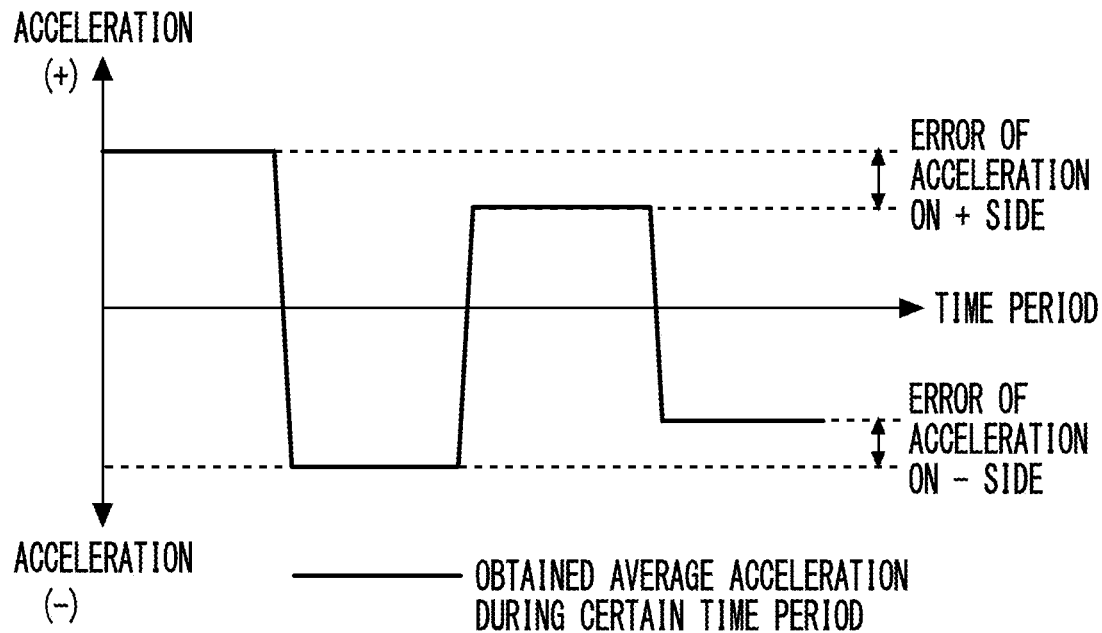
FIG. 6 is a graph showing the detection result of acceleration detected by the rope tension measurement device utilized in the elevator rope tension measurement system of the embodiment 1.

FIG. 6 is a graph showing the detection result of acceleration detected by the rope tension measurement device utilized in the elevator rope tension measurement system of the embodiment 1.

Also in the third example, in the same manner as the first example, the rope tension measurement device 14 is maintained in a standstill state such that the axial direction of the vibration waveform collection unit 18 in which the tension of the rope 6 is measured is aligned with the direction of gravitational acceleration. In such a state, the vibration waveform collection unit 18 collects acceleration data a plurality of number of times during a certain time period.

As shown in FIG. 6, the accuracy calculation unit 19 calculates an average value of accelerations collected by the vibration waveform collection unit 18 for each time and the maximum value of an absolute difference between the average values for each time. The judgement unit 20 judges whether the tension of the rope 6 can be measured by the rope tension measurement device 14 based on the maximum value calculated by the accuracy calculation unit 19. Specifically, the judgement unit 20 judges that the rope tension measurement device 14 can be utilized for the measurement of the tension of the rope 6 when the maximum value calculated by the accuracy calculation unit 19 is less than a threshold set in advance. The judgement unit 20 judges that the rope tension measurement device 14 cannot be utilized for the measurement of the tension of the rope 6 when the maximum value calculated by the accuracy calculation unit 19 is equal to or more than the threshold set in advance. Note that when acceleration on a + side and acceleration on a − side are collected by the vibration waveform collection unit 18 by inverting the rope tension measurement device 14, a judgement can also be made by using both the acceleration on the + side and acceleration on the − side.

Note that, in the first to the third examples, when acceleration on the + side and acceleration on the − side are collected by the vibration waveform collection unit 18 by inverting the rope tension measurement device 14, a judgement can also be made by using both the acceleration on the + side and acceleration on the − side. After the completion of the collection of the acceleration on the + side or the − side by the vibration waveform collection unit 18, the rope tension measurement device 14 is informed of the completion of the collection by a sound via a speaker S. Alternatively, the completion of the collection is indicated on the touch panel unit 16 to prompt the worker to shift to the next measurement. Further, also after the completion of measurement or judgement of accuracy, variance, or error, the rope tension measurement device 14 is informed of the completion by a sound via the speaker S. Alternatively, the completion of the judgement is indicated on the touch panel unit 16.

Next, the fourth example of the pre-check of the rope tension measurement device 14 will be described with reference to FIG. 7.

Figure 7:
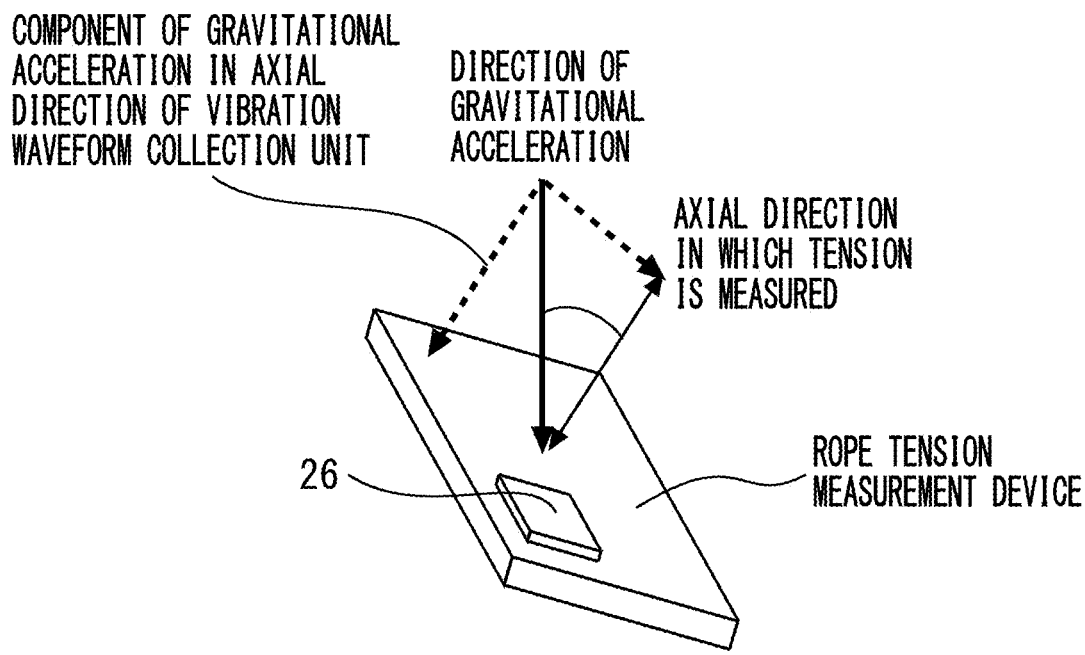
FIG. 7 is a perspective view of the rope tension measurement device utilized in the elevator rope tension measurement system of the embodiment 1.

FIG. 7 is a perspective view of the rope tension measurement device utilized in the elevator rope tension measurement system of the embodiment 1.

As shown in FIG. 7, in the case where the rope tension measurement device 14 includes an angle detection unit 26, such as a gyro, based on an angle detected by the angle detection unit 26, the vibration waveform collection unit 18 calculates the component of gravitational acceleration from the acceleration detected by the acceleration detection unit. The judgement unit 20 judges whether the tension of the rope 6 can be measured by the rope tension measurement device 14 based on the component of gravitational acceleration calculated by the vibration waveform collection unit 18. A judgement method used at this point of operation may be substantially equal to any one of judgement methods used in the first example to the third example.

Next, a method for managing the rope tension measurement device 14 will be described with reference to FIG. 8.

Figure 8:
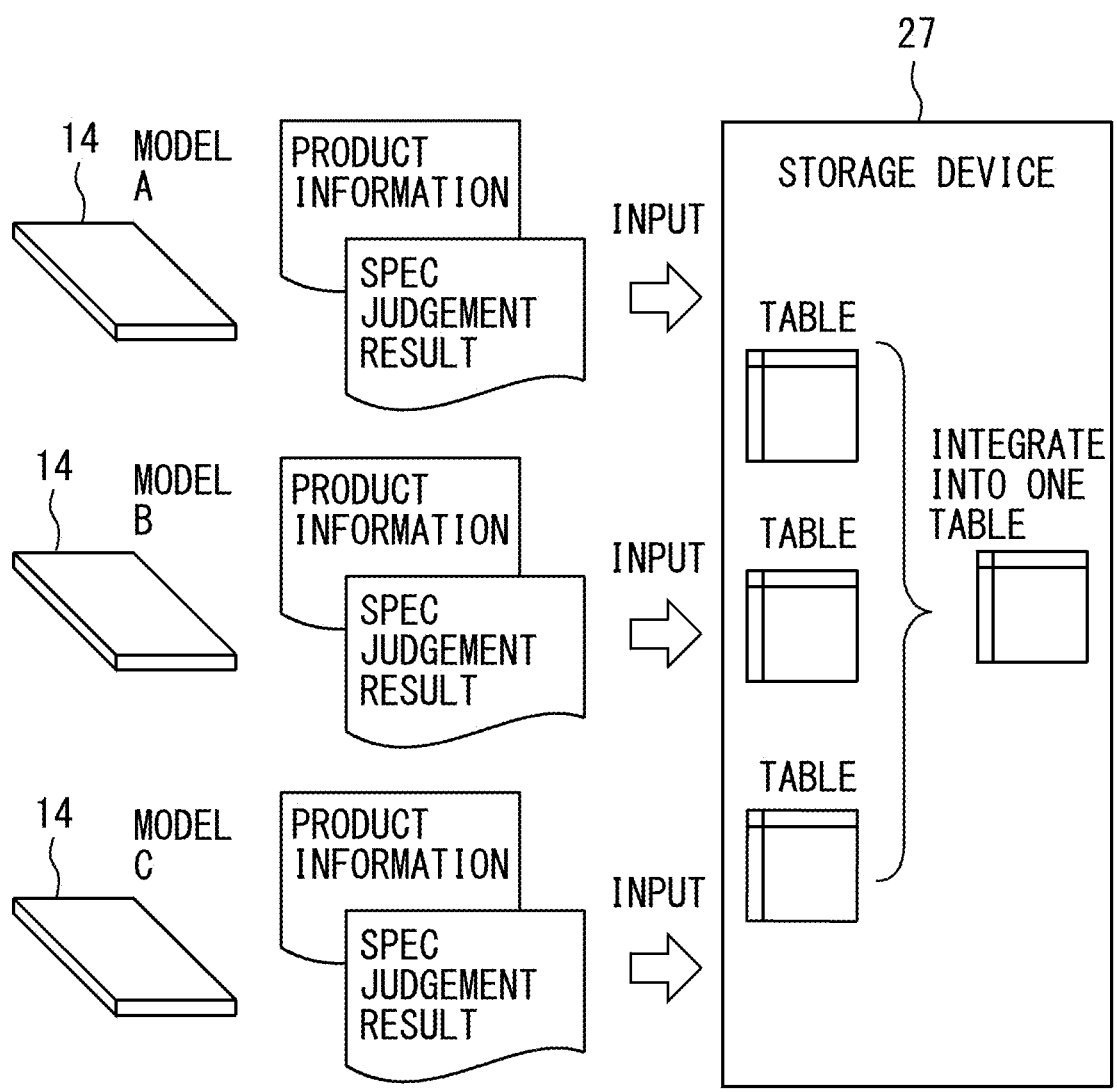
FIG. 8 is a view for describing a method for managing the rope tension measurement device utilized in the elevator rope tension measurement system of the embodiment 1.

FIG. 8 is a view for describing the method for managing the rope tension measurement device utilized in the elevator rope tension measurement system of the embodiment 1.

In FIG. 8, a storage device 27 is provided to the maintenance company or the like for the elevator. The storage device 27 receives, from each of a plurality of models of the rope tension measurement devices 14, product information from which an acceleration sensor serving as the vibration waveform collection unit 18 can be identified and information on the spec judgement result relating to whether the tension of the rope 6 can be measured by the rope tension measurement device 14. Then, the storage device 27 stores the product information and the information on the spec judgement result in an associated manner to form a measurement device selection table.

Next, the first example of the mounting tool 15 will be described with reference to FIG. 9 to FIG. 12.

Figure 9:
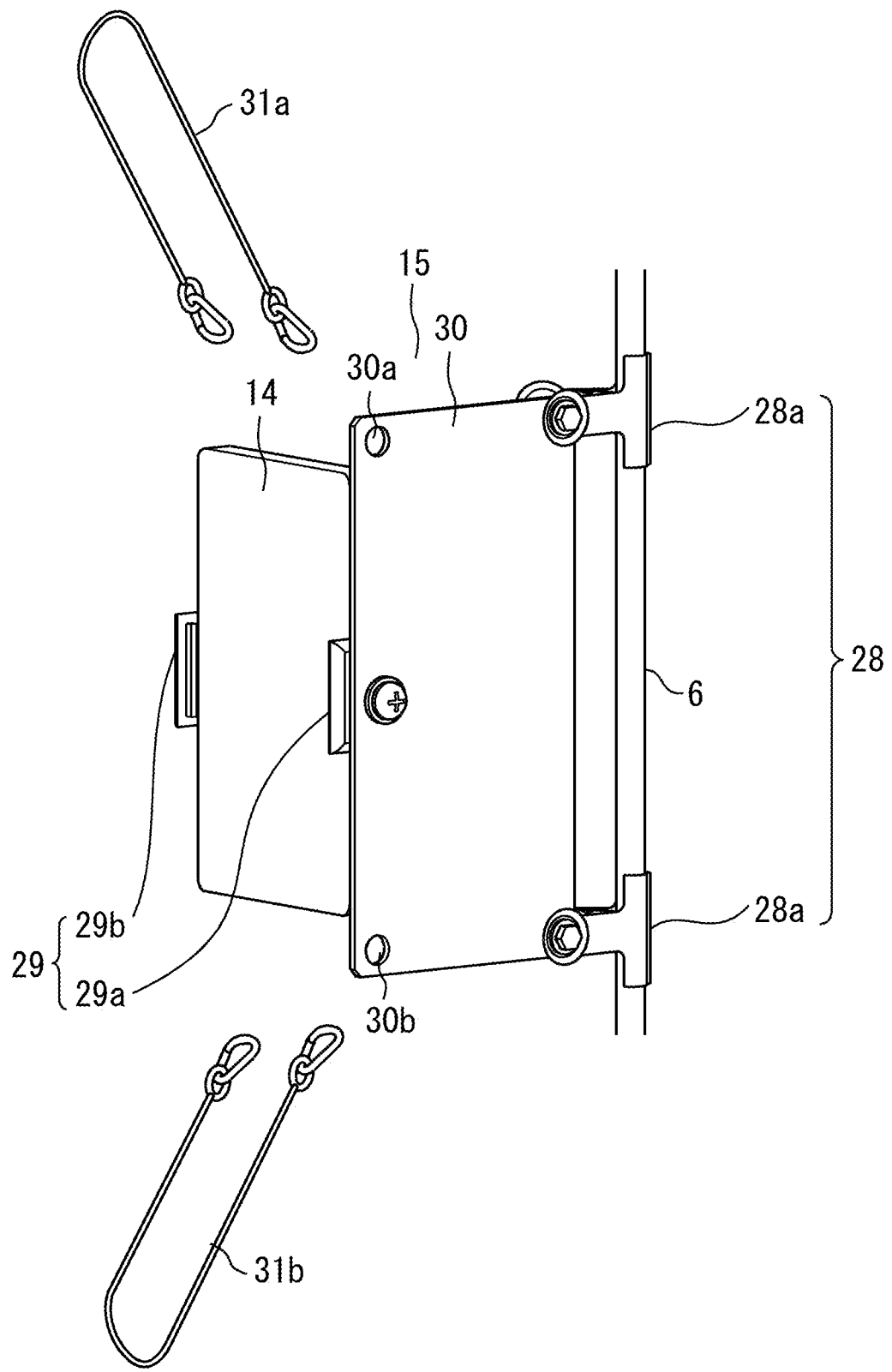
FIG. 9 is a perspective view of a first example of a mounting tool utilized in the elevator rope tension measurement system of the embodiment 1.
Figure 10:
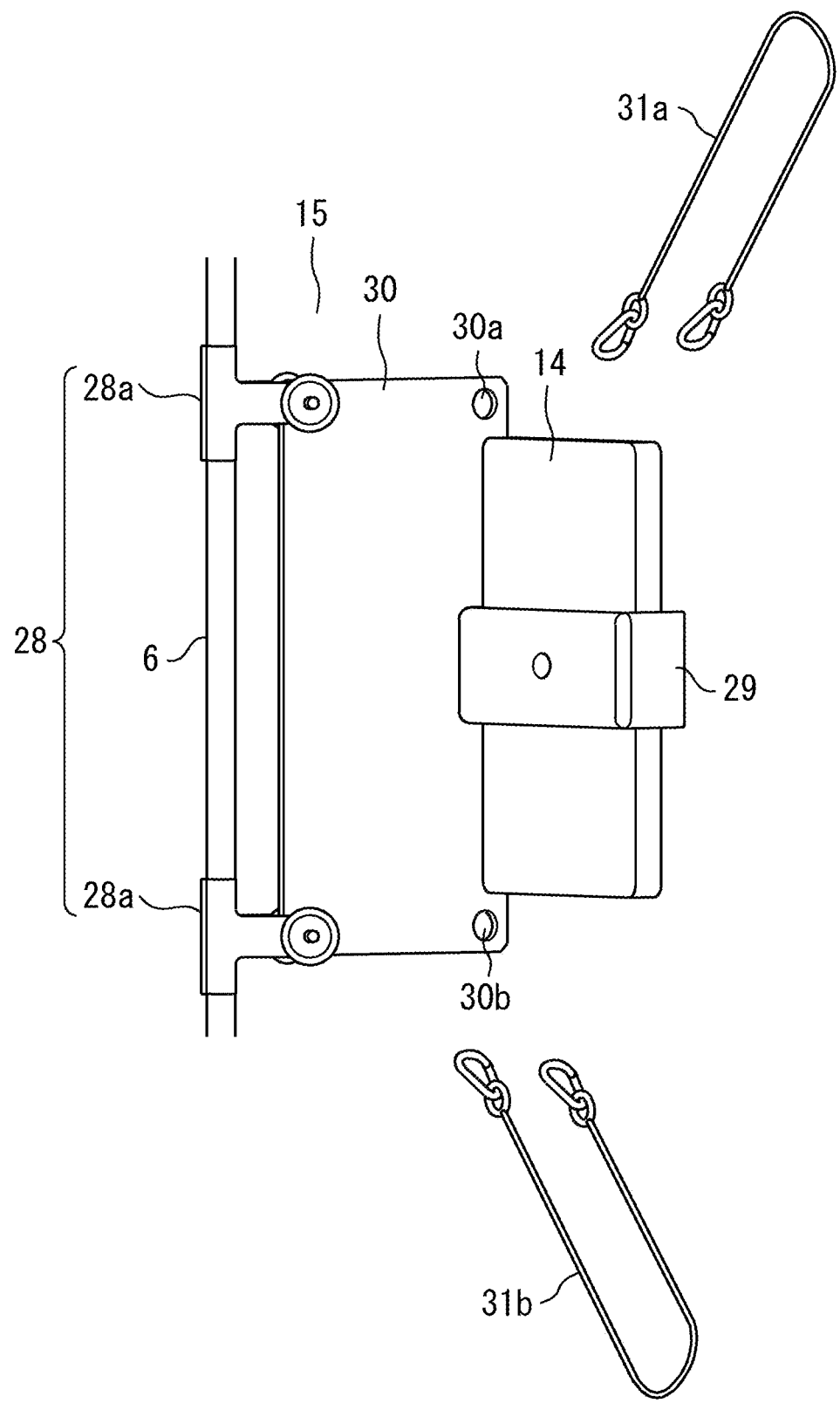
FIG. 10 is a perspective view of the first example of the mounting tool utilized in the elevator rope tension measurement system of the embodiment 1.
Figure 11:
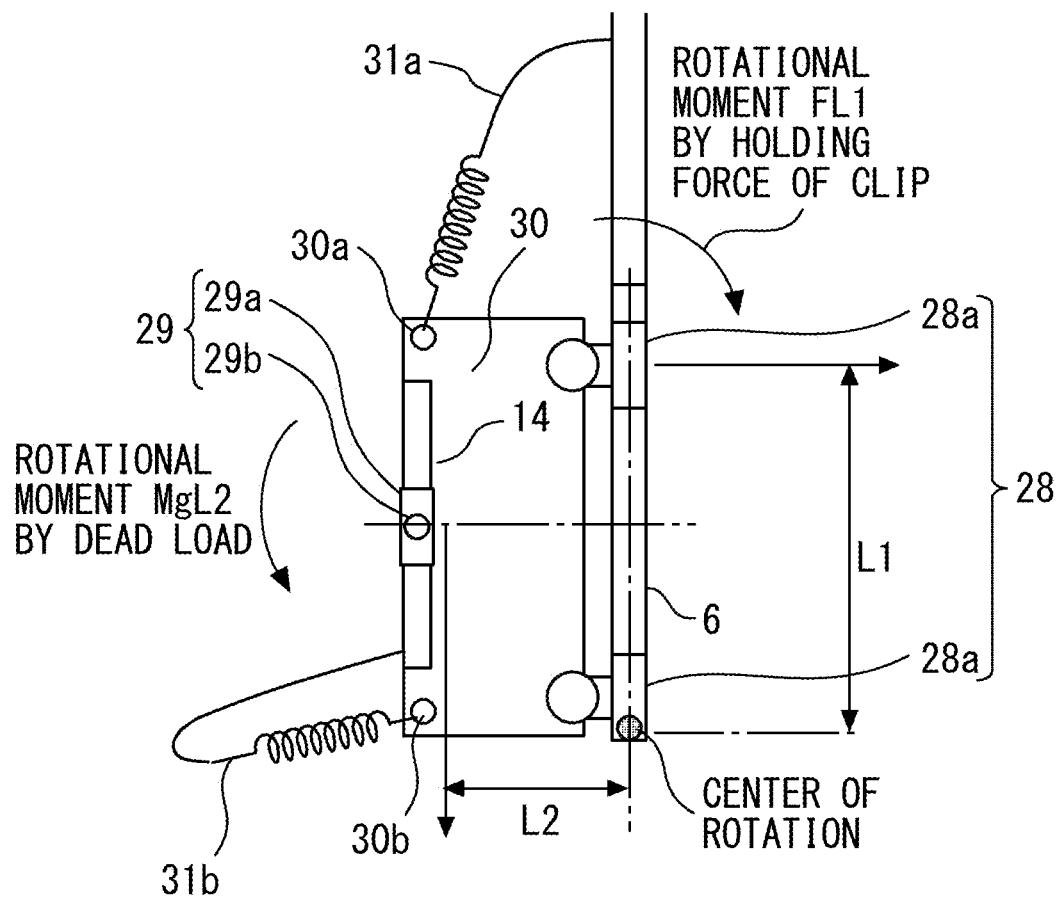
FIG. 11 is a side view of the first example of the mounting tool utilized in the elevator rope tension measurement system of the embodiment 1.

FIG. 9 and FIG. 10 are perspective views of the first example of the mounting tool utilized in the elevator rope tension measurement system of the embodiment 1. FIG. 11 is a side view of the first example of the mounting tool utilized in the elevator rope tension measurement system of the embodiment 1. FIG. 12 is a plan view of the first example of the mounting tool utilized in the elevator rope tension measurement system of the embodiment 1.

As shown in FIG. 9 to FIG. 11, the mounting tool 15 includes a first holding body 28, a second holding body 29, a connecting body 30, a first fall preventing body 31a, and a second fall preventing body 31b.

For example, the first holding body 28 includes a pair of holding parts 28a. The pair of holding parts 28a are arranged in a row in the vertical direction. For example, the pair of holding parts 28a may be clips each having a holding surface with a curvature conforming to the outer diameter of the rope 6. The pair of holding parts 28a hold the rope 6.

For example, the second holding body 29 includes a first holding part 29a and a second holding part 29b. The first holding part 29a is provided to one side of the second holding body 29. The first holding part 29a is provided in such a manner that the first holding part 29a can be moved in the horizontal direction. The first holding part 29a holds the rope tension measurement device 14 from the side. The second holding part 29b generates a load in the horizontal direction by a stress of an elastic body, such as a spring, so as to apply a force of holding the rope tension measurement device 14 to the first holding part 29a.

For example, the connecting body 30 is formed into a rectangular shape. The connecting body 30 connects the first holding body 28 with the second holding body 29. For example, one side of the connecting body 30 is connected with the pair of holding parts 28a by bolts or the like. For example, the other side of the connecting body 30 is connected with one side of the second holding body 29. The connecting body 30 is orthogonal to the second holding body 29. The connecting body 30 has a plate thickness with a natural frequency higher than the frequency of the rope 6. Provided that the connecting body 30 has a natural frequency higher than the frequency of the rope 6, it is not always necessary for the connecting body 30 to have a rectangular shape.

The connecting body 30 has a first mounting hole 30a and a second mounting hole 30b. The first mounting hole 30a is formed in the upper portion of the connecting body 30 at a position close to the second holding body 29. The second mounting hole 30b is formed in the lower portion of the connecting body 30 at a position close to the second holding body 29.

The connecting body 30 may have punch holes or the like so as to reduce weight. Further, the connecting body 30 may be provided with a rib so as to reinforce the connecting body 30.

For example, the first fall preventing body 31a may be a curl cord. One side of the first fall preventing body 31a is connected to the mounting tool 15. In the first example, the one side of the first fall preventing body 31a is connected to the connecting body 30 via the first mounting hole 30a. For example, the other side of the first fall preventing body 31a is mounted, at a position higher than the rope tension measurement device 14, to an adjacent rope 6 other than the rope on which a measurement is to be made or to a structural body of the elevator. For example, the other side of first fall preventing body 31a is mounted to the belt or the like of the worker. For example, the other side of the first fall preventing body 31a is mounted to a handrail or the like provided to the ceiling of the car 9. The first fall preventing body 31a prevents the mounting tool 15 from falling.

For example, the second fall preventing body 31b may be a curl cord. One side of the second fall preventing body 31b is connected to the mounting tool 15. In the first example, the one side of the second fall preventing body 31b is connected to the connecting body 30 via the second mounting hole 30b. For example, the other side of the second fall preventing body 31b is mounted to the lower portion of the rope tension measurement device 14.

As shown in FIG. 11, in the mounting tool 15, the product of a distance L1 between positions where the pair of holding parts 28a hold the rope 6 and a holding force F of an upper holding part 28a for holding the rope 6 is set to be greater than the rotational moment MgL2 by a dead load Mg of the rope tension measurement device 14.

Figures 12A, 12B:
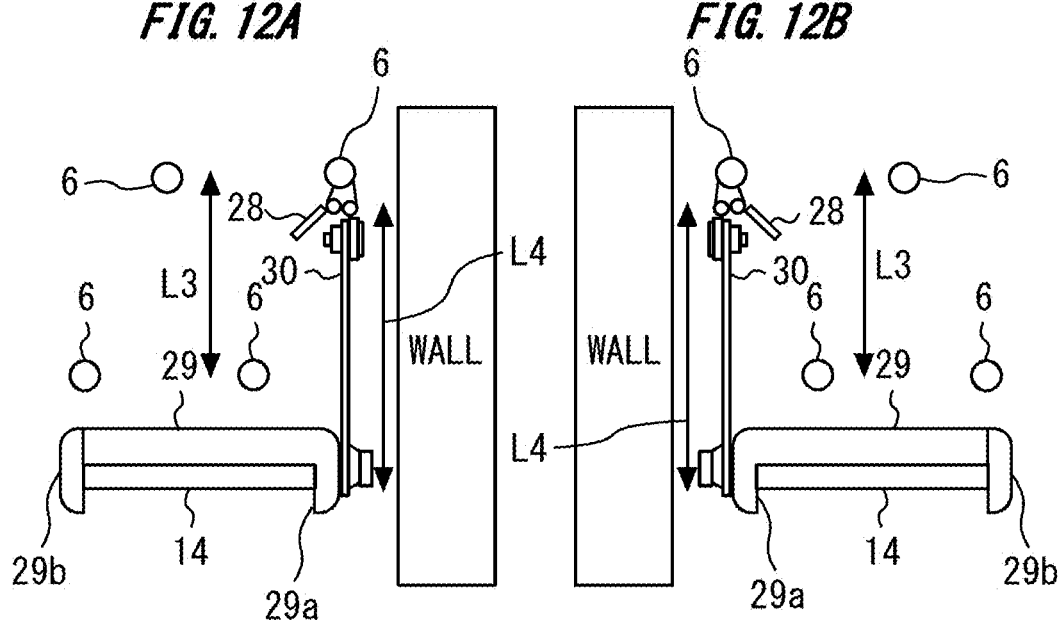
FIG. 12A is a plan view of the first example of the mounting tool utilized in the elevator rope tension measurement system of the embodiment 1.
FIG. 12B is a plan view of the first example of the mounting tool utilized in the elevator rope tension measurement system of the embodiment 1.
Figure 12C:
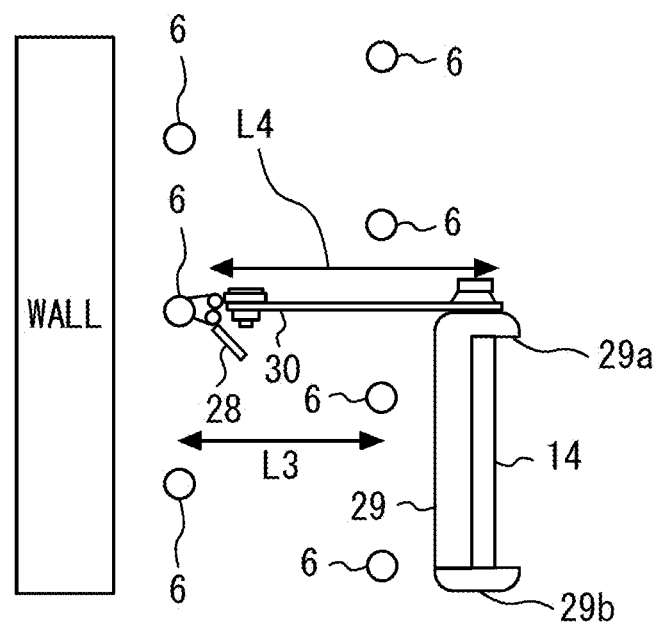
FIG. 12C is a plan view of the first example of the mounting tool utilized in the elevator rope tension measurement system of the embodiment 1.

As shown in FIG. 12A to FIG. 12C, the plurality of ropes 6 are arranged in a state of being divided into the first row and the second row. The ropes 6 in the first row and the ropes 6 in the second row are disposed with a separation L3.

A width L4 of the connecting body 30 is greater than the separation L3 between the ropes 6 in the first row and the ropes 6 in the second row. Therefore, when the first holding body 28 holds any one of the ropes 6 in the first row, the second holding body 29 is disposed on a side opposite to the ropes 6 in the first row with respect to the ropes 6 in the second row. As a result, the rope tension measurement device 14 is disposed at a position that does not interfere with the ropes 6 in the second row.

For example, in the case where the ropes 6 in the first row are disposed on the back side, the ropes 6 in the second row are disposed on the front side, and the wall of the hoistway 1 is disposed on the right side as shown in FIG. 12A, the first holding body 28 holds the rightmost rope 6 in the first row so that the second holding body 29 is disposed on the left of the connecting body 30. As a result, the rope tension measurement device 14 is disposed at a position that does not interfere with the wall.

For example, in the case where the ropes 6 in the first row are disposed on the back side, the ropes 6 in the second row are disposed on the front side, and the wall of the hoistway 1 is disposed on the left side as shown in FIG. 12B, the first holding body 28 holds the leftmost rope 6 in the first row so that the second holding body 29 is disposed on the right of the connecting body 30. As a result, the rope tension measurement device 14 is disposed at a position that does not interfere with the wall.

For example, in the case where the ropes 6 in the first row are disposed on the left side, the ropes 6 in the second row are disposed on the right side, and the wall of the hoistway 1 is disposed on the left side of the ropes 6 in the first row as shown in FIG. 12C, the first holding body 28 holds a center rope 6 in the first row so that the second holding body 29 is disposed on the right of the ropes 6 in the second row. As a result, the rope tension measurement device 14 is disposed at a position that does not interfere with the wall.

Next, the second example of the mounting tool 15 will be described with reference to FIG. 13 and FIG. 14.

Figure 13:
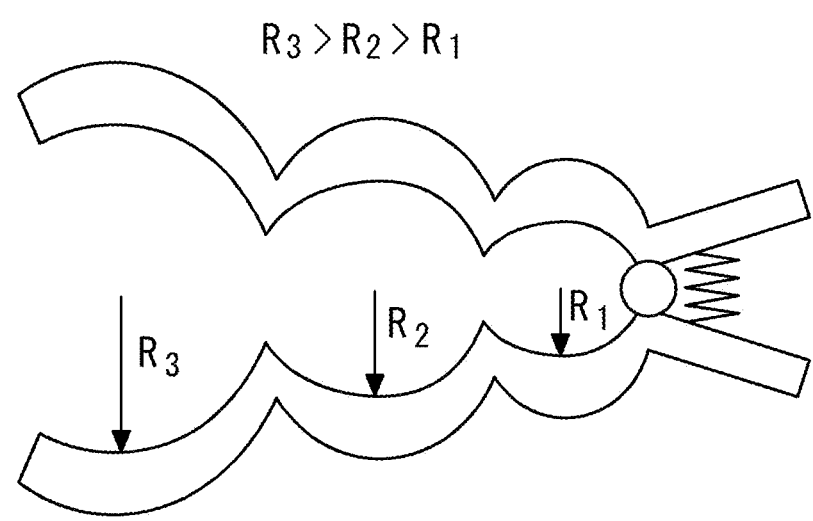
FIG. 13 is a plan view of a second example of the mounting tool utilized in the elevator rope tension measurement system of the embodiment 1.

FIG. 13 is a plan view of the second example of the mounting tool utilized in the elevator rope tension measurement system of the embodiment 1. FIG. 14 is a side view of the second example of the mounting tool utilized in the elevator rope tension measurement system of the embodiment 1.

Figure 14:
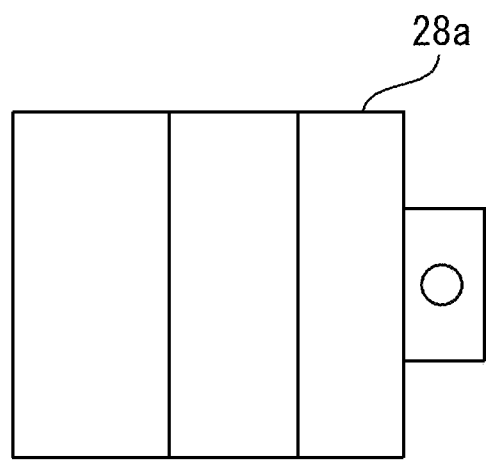
FIG. 14 is a side view of the second example of the mounting tool utilized in the elevator rope tension measurement system of the embodiment 1.

As shown in FIG. 13 and FIG. 14, a holding part 28a of the first holding body 28 is a clip having holding surfaces with a plurality of curvatures respectively conforming to outer diameters of the plurality of ropes 6. Specifically, the first holding body 28 has the first holding surface, the second holding surface, and the third holding surface. The first holding surface, the second holding surface, and the third holding surface are continuously formed from the fulcrum of the clip in this order.

The curvature of the first holding surface is $R_1$. The curvature of the second holding surface is $R_2$. $R_2$ is set to be greater than $R_1$. The curvature of the third holding surface is $R_3$. $R_3$ is set to be greater than $R_2$. In the second example, the holding part 28a has three holding surfaces having different curvatures. However, the holding part 28a may have two holding surfaces or four or more holding surfaces.

Each of these curvatures may have a range of values. For example, $R_1$ may be applicable to a rope 6 having a diameter of 19 mm to 24 mm. For example, $R_2$ may be applicable to a rope 6 having a diameter of 13 mm to 18 mm. For example, $R_3$ may be applicable to a rope 6 having a diameter of 8 mm to 12 mm.

Next, the third example of the mounting tool 15 will be described with reference to FIG. 15.

Figure 15:
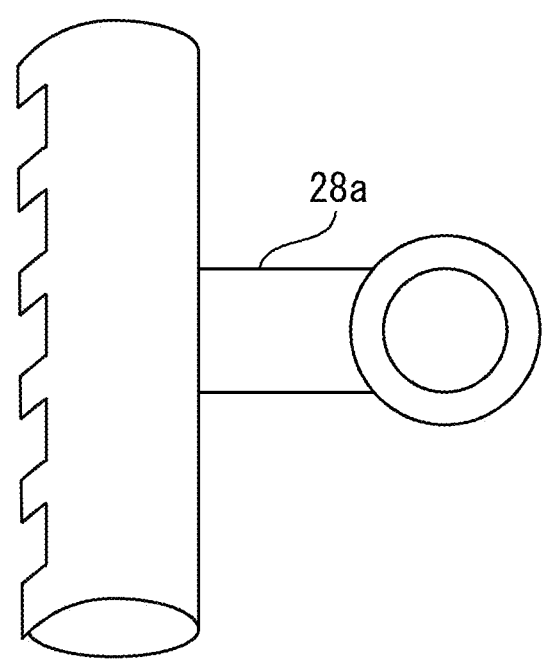
FIG. 15 is a perspective view of a third example of the mounting tool utilized in the elevator rope tension measurement system of the embodiment 1.

FIG. 15 is a perspective view of the third example of the mounting tool utilized in the elevator rope tension measurement system of the embodiment 1.

As shown in FIG. 15, in the first holding body 28, the tip of the holding part 28a is formed into an uneven shape so as to fit to unevenness on the outer periphery of the rope 6.

Next, the fourth example of the mounting tool 15 will be described with reference to FIG. 16.

Figure 16:
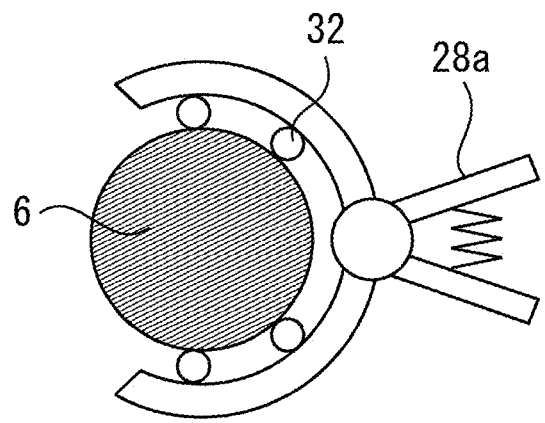
FIG. 16 is a plan view of a fourth example of the mounting tool utilized in the elevator rope tension measurement system of the embodiment 1.

FIG. 16 is a plan view of the fourth example of the mounting tool utilized in the elevator rope tension measurement system of the embodiment 1.

As shown in FIG. 16, in the first holding body 28, the inner surface of the holding part 28a includes a plurality of protruding parts 32 which fit to unevenness on the outer periphery of the rope 6.

Next, the fifth example of the mounting tool 15 will be described with reference to FIG. 17.

Figure 17:
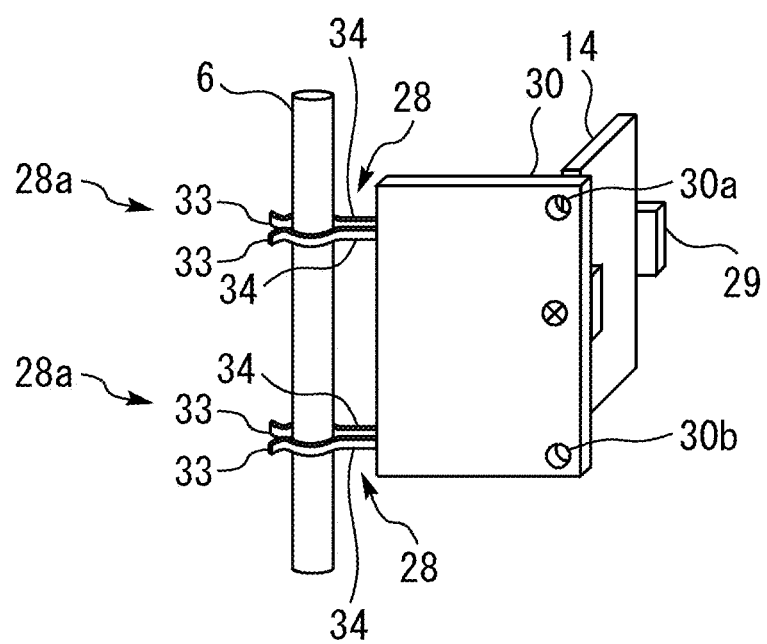
FIG. 17 is a perspective view of a fifth example of the mounting tool utilized in the elevator rope tension measurement system of the embodiment 1.

FIG. 17 is a perspective view of the fifth example of the mounting tool utilized in the elevator rope tension measurement system of the embodiment 1.

As shown in FIG. 17, in the first holding body 28, each of the pair of holding parts 28a includes a pair of holding pieces 33.

The connecting body 30 includes a pair of connecting parts. Each of the pair of connecting parts includes a pair of connecting pieces 34.

Each holding piece 33 and each connecting piece 34 are formed of a wire member as an integral body.

Next, the sixth example of the mounting tool 15 will be described with reference to FIG. 18 and FIG. 19.

Figure 18:
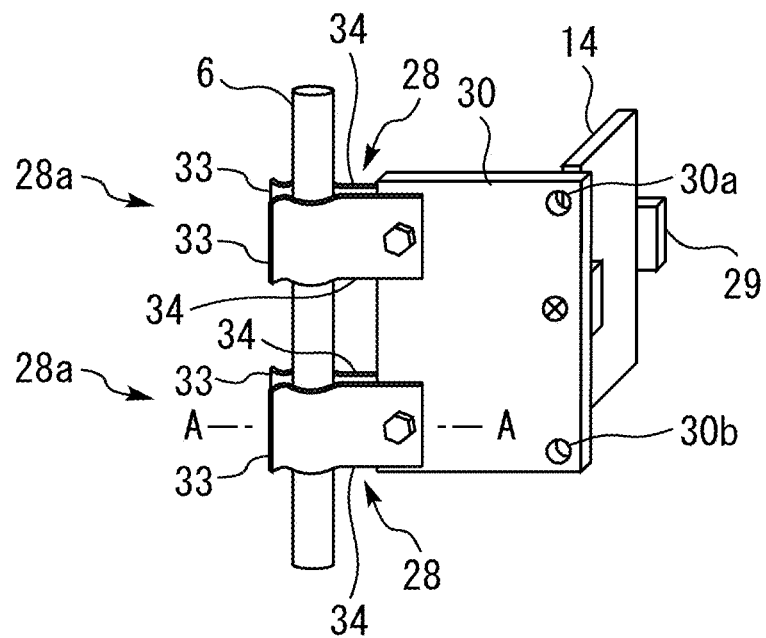
FIG. 18 is a perspective view of a sixth example of the mounting tool utilized in the elevator rope tension measurement system of the embodiment 1.

FIG. 18 is a perspective view of the sixth example of the mounting tool utilized in the elevator rope tension measurement system of the embodiment 1. FIG. 19 is a plan view of the main part of the sixth example of the mounting tool utilized in the elevator rope tension measurement system of the embodiment 1.

Figure 19:
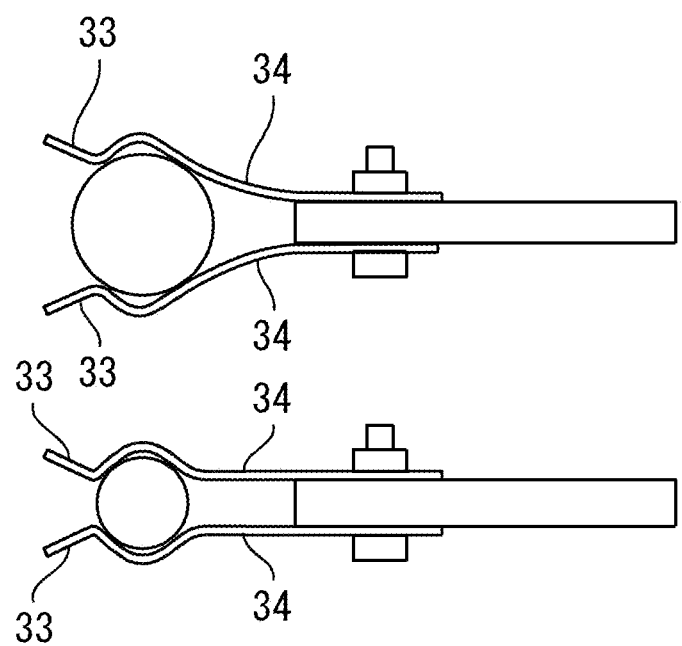
FIG. 19 is a plan view of a main part of the sixth example of the mounting tool utilized in the elevator rope tension measurement system of the embodiment 1.

As shown in FIG. 18 and FIG. 19, in the first holding body 28, each of the pair of holding parts 28a includes a pair of holding pieces 33.

The connecting body 30 includes a pair of connecting parts. Each of the pair of connecting parts includes a pair of connecting pieces 34.

Each holding piece 33 and each connecting piece 34 are formed of a plate member as an integral body. The tip side of each of the pair of holding pieces 33 is caused to have a large width so as to improve ease of insertion of the rope 6.

Next, the seventh example of the mounting tool 15 will be described with reference to FIG. 20.

Figure 20:
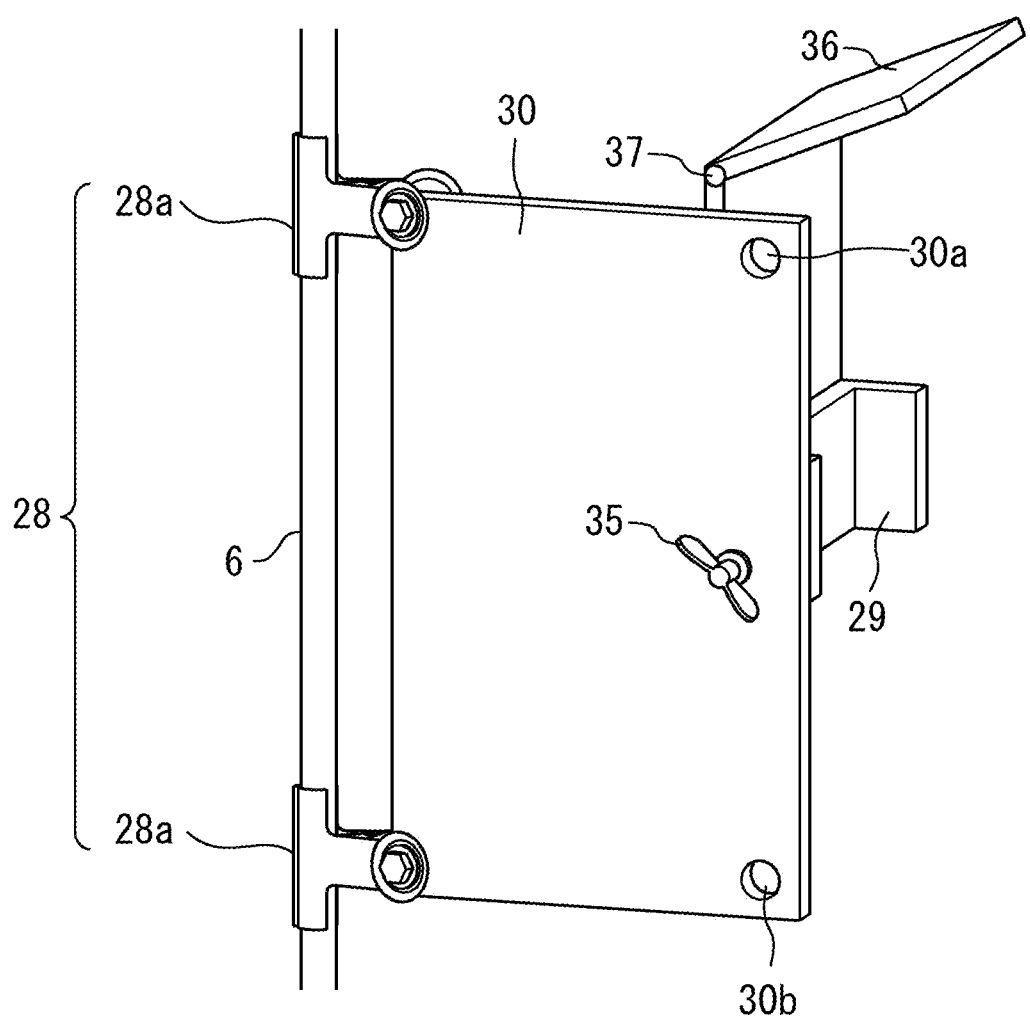
FIG. 20 is a perspective view of a main part of a seventh example of the mounting tool utilized in the elevator rope tension measurement system of the embodiment 1.

FIG. 20 is a perspective view of the seventh example of the mounting tool utilized in the elevator rope tension measurement system of the embodiment 1.

As shown in FIG. 20, the mounting tool 15 includes a rotary body 35, a light shielding body 36, and an angle adjustment body 37.

For example, the rotary body 35 may be a butterfly screw. For example, the rotary body 35 may be a clutch. The rotary body connects the second holding body 29 with the connecting body 30 in a rotatable manner. The rotary body 35 is provided in such a manner that the rotary body 35 can adjust the angle of the second holding body 29 with respect to the connecting body 30. As a result, it is possible to improve ease of operation for the screen of the rope tension measurement device 14.

For example, the light shielding body 36 is formed into a plate shape. The lower edge portion of the light shielding body 36 is disposed adjacently to the upper edge portion of the second holding body 29.

The angle adjustment body 37 connects the lower edge portion of the light shielding body 36 with the upper edge portion of the second holding body 29 in a rotatable manner. The angle adjustment body 37 is provided in such a manner that the angle adjustment body 37 can adjust the angle of the light shielding body 36 with respect to the second holding body 29. The angle adjustment body 37 is provided in such a manner that the angle adjustment body 37 can prevent the screen of the rope tension measurement device 14 from being irradiated with light from the outside. As a result, it is possible to improve visibility of the screen of the rope tension measurement device 14.

Both the rotary body 35 and the light shielding body 36 may be provided, or either one of the rotary body 35 or the light shielding body 36 may be provided.

Next, the eighth example of the mounting tool 15 will be described with reference to FIG. 21.

Figure 21:
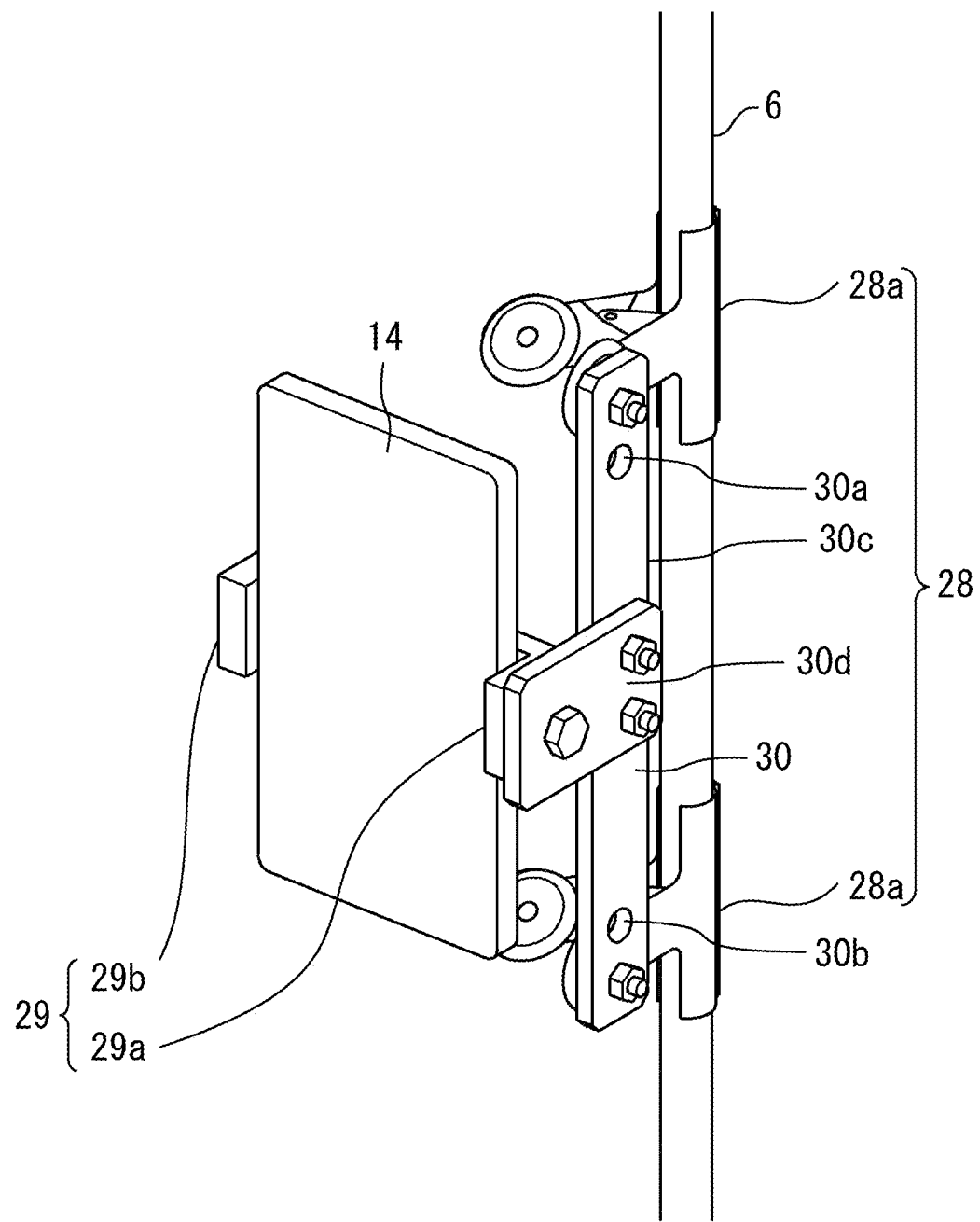
FIG. 21 is a perspective view of a main part of an eighth example of the mounting tool utilized in the elevator rope tension measurement system of the embodiment 1.

FIG. 21 is a perspective view of the eighth example of the mounting tool utilized in the elevator rope tension measurement system of the embodiment 1.

As shown in FIG. 21, the connecting body 30 is divided into a first divided part 30c and a second divided part 30d so as to reduce weight.

The first divided part 30c is disposed in such a manner that the longitudinal direction of the first divided part 30c matches the vertical direction. The upper portion of the first divided part 30c is connected to the upper holding part 28a. The lower portion of the first divided part 30c is connected to a lower holding part 28a.

The second divided part 30d is connected with the center of the first divided part 30c in the longitudinal direction by bolts or the like. The tip of the second divided part 30d is connected with one side of the second holding body 29 by a bolt or the like.

Next, the ninth example of the mounting tool 15 will be described with reference to FIG. 22.

Figure 22:
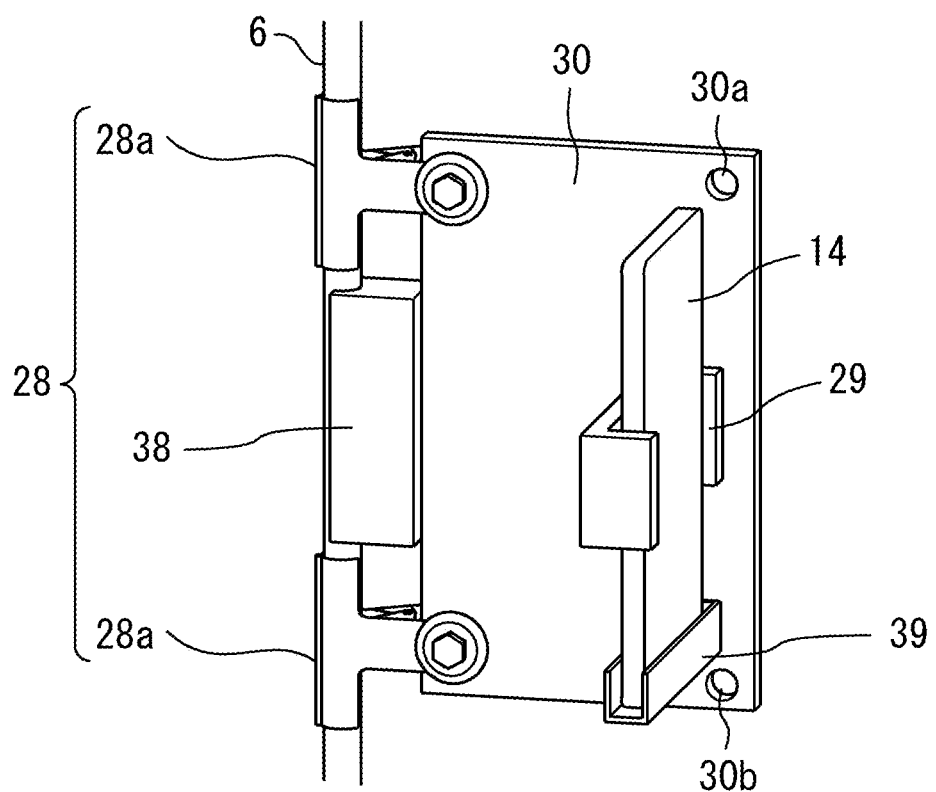
FIG. 22 is a perspective view of a main part of a ninth example of the mounting tool utilized in the elevator rope tension measurement system of the embodiment 1.

FIG. 22 is a perspective view of the ninth example of the mounting tool utilized in the elevator rope tension measurement system of the embodiment 1.

As shown in FIG. 22, the mounting tool 15 includes a rotation preventing body 38 and a third fall preventing body 39.

For example, the rotation preventing body 38 is formed into a rectangular shape. For example, the rotation preventing body 38 is made of urethane rubber. For example, the rotation preventing body 38 is made of silicone rubber. The rotation preventing body 38 is disposed at a position between the pair of holding parts 28a and between the rope 6 and the connecting body 30. In such a case, the rotation preventing body 38 is disposed in a state of being elastically deformed in a direction in which the rope 6 and the connecting body 30 are arranged in a row. As a result, it is possible to prevent the rotation of the rope tension measurement device 14 with respect to the rope 6.

The third fall preventing body 39 is connected with the connecting body 30 at a position below the second holding body 29. The third fall preventing body 39 has a groove. The groove opens upward. The third fall preventing body 39 supports the rope tension measurement device 14 from below in a state where the groove receives the lower portion of the rope tension measurement device 14. As a result, it is possible to prevent the rope tension measurement device 14 from falling.

Both the rotation preventing body 38 and the third fall preventing body 39 may be provided, or either one of the rotation preventing body 38 or the third fall preventing body 39 may be provided.

Next, the tenth example of the mounting tool 15 will be described with reference to FIG. 23.

Figure 23:
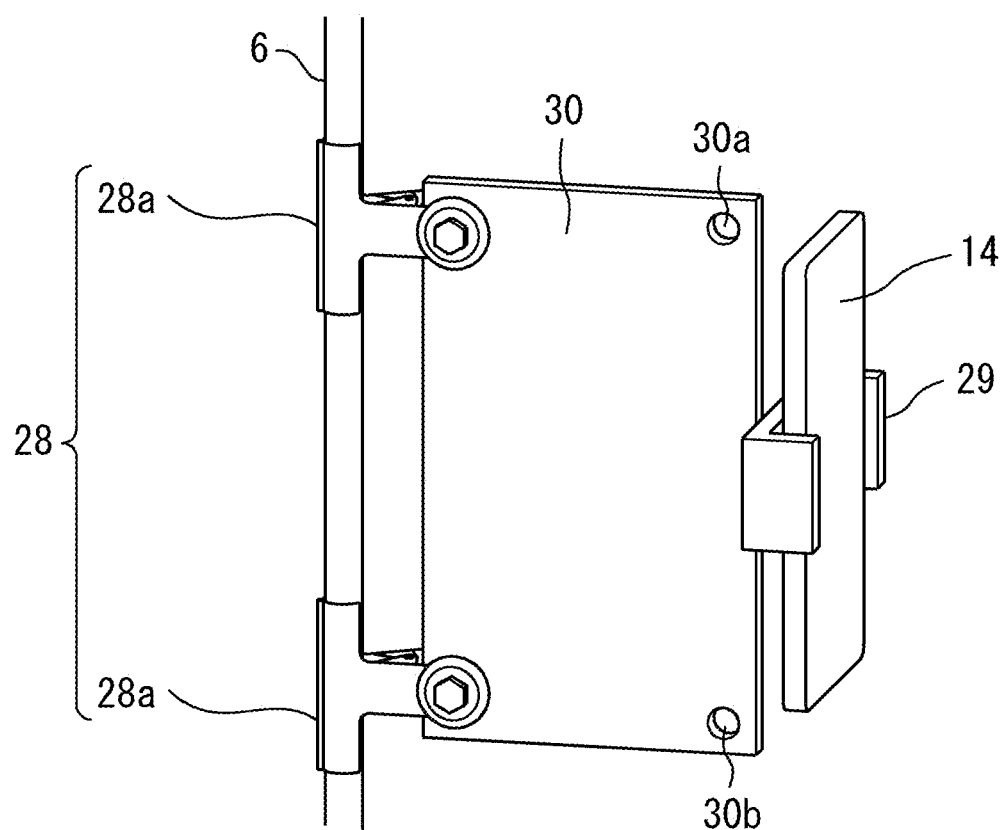
FIG. 23 is a perspective view of a main part of a tenth example of the mounting tool utilized in the elevator rope tension measurement system of the embodiment 1.

FIG. 23 is a perspective view of the tenth example of the mounting tool utilized in the elevator rope tension measurement system of the embodiment 1.

As shown in FIG. 23, the connecting body 30 is connected with the center of the rear surface of the second holding body 29 in the width direction. In such a case, the connecting body 30 supports the rope tension measurement device 14 via the second holding body 29 in a balanced manner in the width direction of the rope tension measurement device 14. As a result, it is possible to prevent the rotation of the mounting tool 15 when vibration is applied to the rope 6.

Next, the eleventh example of the mounting tool 15 will be described with reference to FIG. 24.

Figure 24:
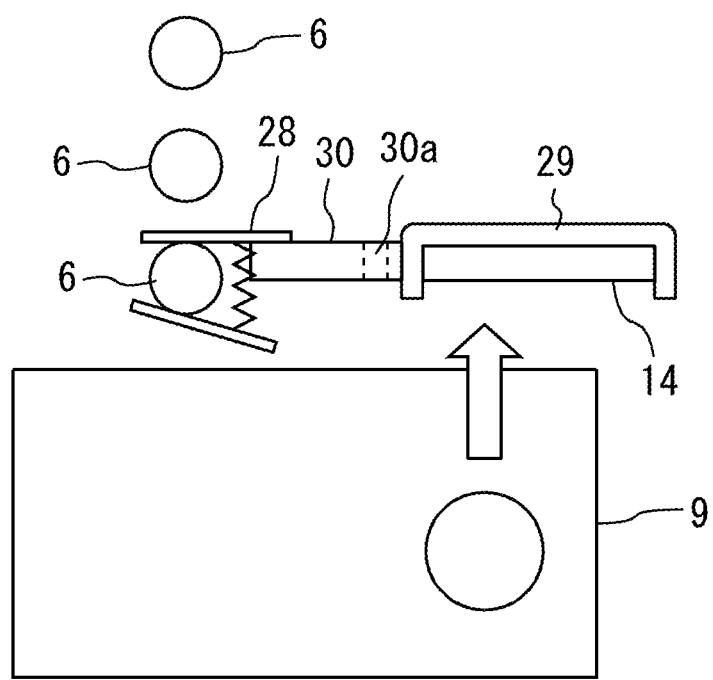
FIG. 24 is a plan view of a main part of an eleventh example of the mounting tool utilized in the elevator rope tension measurement system of the embodiment 1.

FIG. 24 is a plan view of the eleventh example of the mounting tool utilized in the elevator rope tension measurement system of the embodiment 1.

As shown in FIG. 24, the plurality of ropes 6 are disposed on the back side of the car 9. The plurality of ropes 6 are arranged along a line parallel to a normal line to the back-side surface of the car 9.

The connecting body 30 is connected with the second holding body 29 in such a manner that the screen of the rope tension measurement device 14 is directed toward the car 9. As a result, it is possible to improve visibility of the screen of the rope tension measurement device 14 for the worker.

Next, a method for calculating a frequency of a vibration waveform by the rope tension measurement device 14 will be described with reference to FIG. 25 to FIG. 28.

Figure 25:
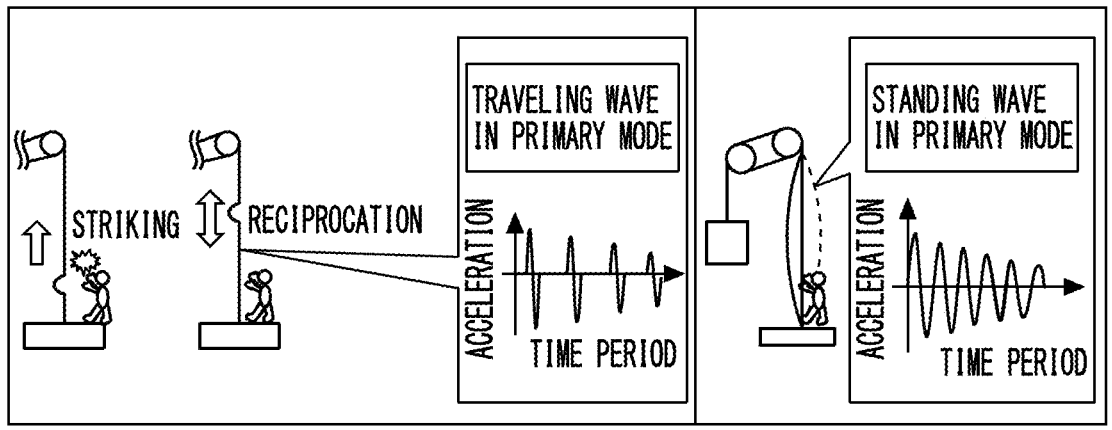
FIG. 25 is a view for describing a vibration wave of a rope of the elevator system utilized in the elevator rope tension measurement system of the embodiment 1.
Figure 26:
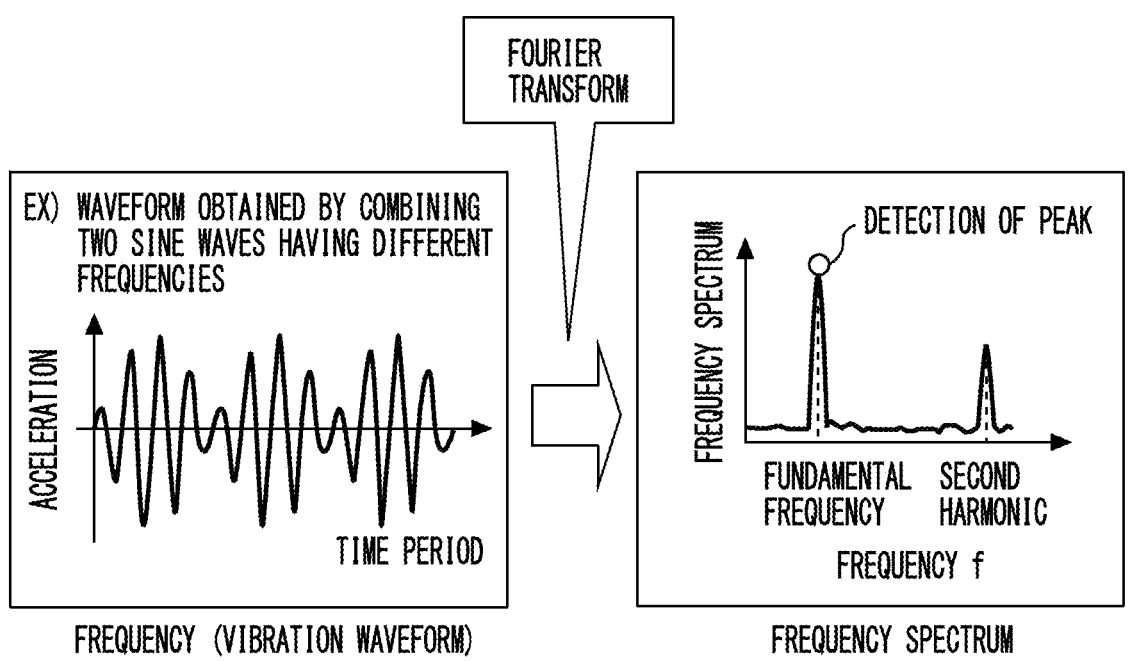
FIG. 26 is a graph for describing the Fourier transform of the vibration waveform of the rope of the elevator system utilized in the elevator rope tension measurement system of the embodiment 1.
Figure 27:
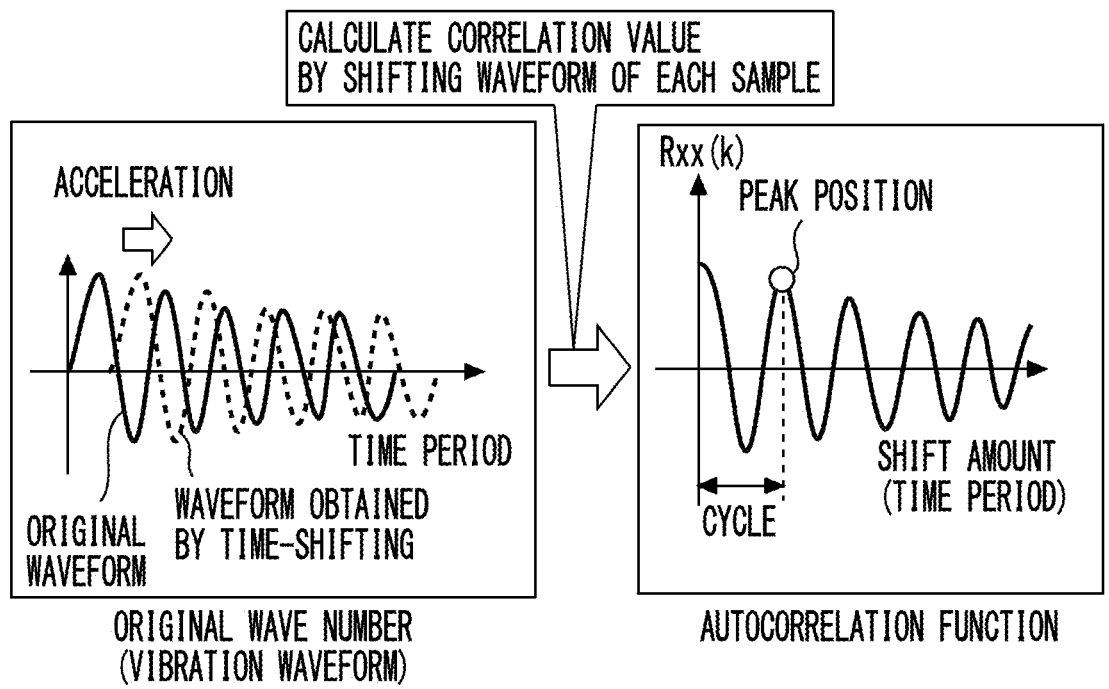
FIG. 27 is a graph for describing the autocorrelation function of the vibration waveform of the rope of the elevator system utilized in the elevator rope tension measurement system of the embodiment 1.
Figure 28:
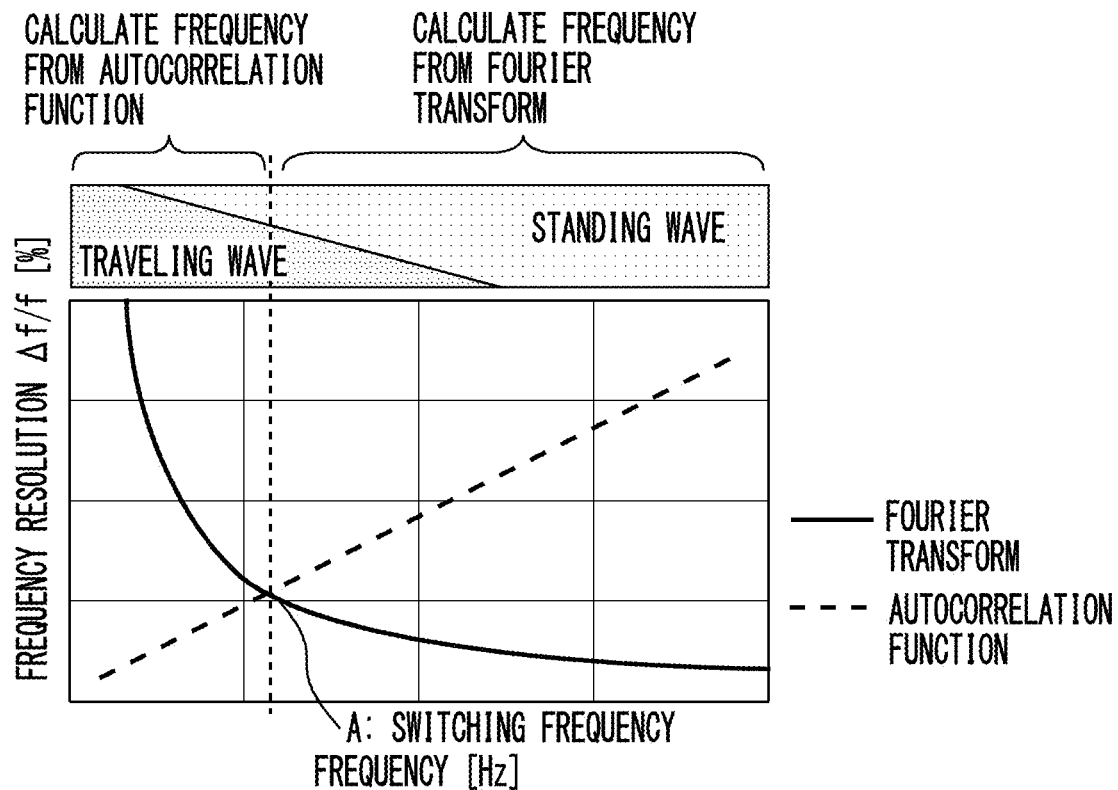
FIG. 28 is a graph for describing a method for calculating a frequency by the rope tension measurement device utilized in the elevator rope tension measurement system of the embodiment 1.

FIG. 25 is a view for describing a vibration wave of the rope of the elevator system utilized in the elevator rope tension measurement system of the embodiment 1. FIG. 26 is a graph for describing the Fourier transform of the vibration waveform of the rope of the elevator system utilized in the elevator rope tension measurement system of the embodiment 1. FIG. 27 is a graph for describing the autocorrelation function of the vibration waveform of the rope of the elevator system utilized in the elevator rope tension measurement system of the embodiment 1. FIG. 28 is a graph for describing a method for calculating the frequency by the rope tension measurement device utilized in the elevator rope tension measurement system of the embodiment 1.

As shown in FIG. 25, in the case where the rope 6 has a long length, a traveling wave is likely to be generated. In the case where the rope 6 has a short length, a standing wave is likely to be generated. The frequency calculation unit 21 adopts an analysis method suitable for the oscillation mode of the rope 6. For example, the rope tension measurement device 14 adopts an analysis method suitable for the oscillation mode of the rope 6 from either the Fourier transform or the autocorrelation function.

When the Fourier transform is adopted, a traveling wave containing no clear sine wave component cannot be analyzed, but a standing wave can be analyzed. At this point of operation, as shown in FIG. 26, the frequency calculation unit 21 analyzes, by the Fourier transform, the amounts of the included respective frequency components when the vibration waveform of the rope 6 is expressed as a waveform obtained by combining sine waves having different frequencies. The frequency calculation unit 21 calculates the frequency of the vibration waveform of the rope 6 from the position of the peak of the frequency spectrum obtained by the Fourier transform.

When the autocorrelation function is adopted, a traveling wave containing no clear sine wave component can be analyzed and a standing wave can also be analyzed. At this point of operation, as shown in FIG. 27, the rope tension measurement device 14 calculates, by the autocorrelation function, the degree of coincidence with the vibration waveform of the rope 6 when the vibration waveform of the rope 6 is time-shifted. Specifically, the autocorrelation function of a waveform x(i) (i=1, 2, . . . N) with N number of samples is expressed by the following expression (1).

[Math. 1]

$$R_{xx}(k) = \frac{1}{N}\sum_{i=1}^{N-k} x(i)x(i+k) \quad (1)$$

In the expression (1), "k" is an integer indicating a shift amount in the time direction.

The frequency calculation unit 21 calculates the cycle of the vibration waveform of the rope 6 from the position of the peak of the autocorrelation function. The frequency calculation unit 21 calculates the frequency of an original vibration waveform of the rope 6 by using the following expression (2).

[Math. 2]

$$f = \frac{1}{T} \quad (2)$$

In the expression (2), "T" indicates a cycle (sec) of a vibration waveform, and "f" indicates a frequency (Hz).

As shown in FIG. 28, the frequency calculation unit 21 selectively uses the Fourier transform or the autocorrelation function so as to adopt the higher resolution range.

A frequency measurement resolution with respect to a measured value f of the vibration frequency of the rope 6 is expressed as Δf/f (%). A measurement resolution when a frequency is obtained by using the autocorrelation function is expressed by the following expression (3). A measurement resolution when a frequency is obtained by the Fourier transform is expressed by the following expression (4).

[Math. 3]

$$\frac{\Delta f}{f} = \frac{1}{\frac{f_s}{f}+1} \quad (3)$$

[Math. 4]

$$\frac{\Delta f}{f} = \frac{f_s}{N}\frac{1}{f} \quad (4)$$

In the expression (3) and the expression (4), "fs" indicates the sampling frequency (Hz) of the vibration waveform collection unit 18. In the expression (4), "N" indicates the number of samples of a vibration waveform on which the Fourier transform is performed.

Based on the expression (3) and the expression (4), in the case where the vibration frequency f of the rope 6 is high, the measurement resolution of the Fourier transform is higher than the measurement resolution of the autocorrelation function when a vibration frequency is obtained, that is, the value of Δf/f of the Fourier transform is smaller than the value of Δf/f of the autocorrelation function. In the case where the vibration frequency f is low, the measurement resolution of the autocorrelation function is higher than the measurement resolution of the Fourier transform when a vibration frequency is obtained, that is, the value of Δf/f of the autocorrelation function is smaller than the value of Δf/f of the Fourier transform. A graph in FIG. 28 shows such characteristics. Based on the expression (3) and the expression (4), a point of intersection between the resolution characteristic curve of the Fourier transform and the resolution characteristic curve of the autocorrelation function is determined by the collection time period and the collection cycles for collecting a vibration waveform data by the vibration waveform collection unit 18, that is, N number of samples and a sampling frequency fs. A frequency at the point of intersection between the characteristic curves is referred to as "switching frequency" in this embodiment. The frequency calculation unit 21 calculates, from the expression (3) and the expression (4), a switching frequency A based on which the Fourier transform or the autocorrelation function is selectively used.

In obtaining the frequency of the vibration waveform, collected by the vibration waveform collection unit 18, from the spectrum of the frequency calculated by the Fourier transform, the frequency calculation unit 21 searches for the peak of the spectrum of the frequency only in the vicinity of the frequency calculated from the autocorrelation function.

The frequency calculation unit 21 judges, based on the calculated frequency, the sufficiency of the collection time period for collecting the vibration waveform data by the vibration waveform collection unit 18. When the frequency calculation unit 21 judges that the collection time period for collecting the vibration waveform data by the vibration waveform collection unit 18 is insufficient, the frequency calculation unit 21 outputs no information on the calculated frequency.

Next, a curve interpolation method will be described with reference to FIG. 29.

Figure 29:
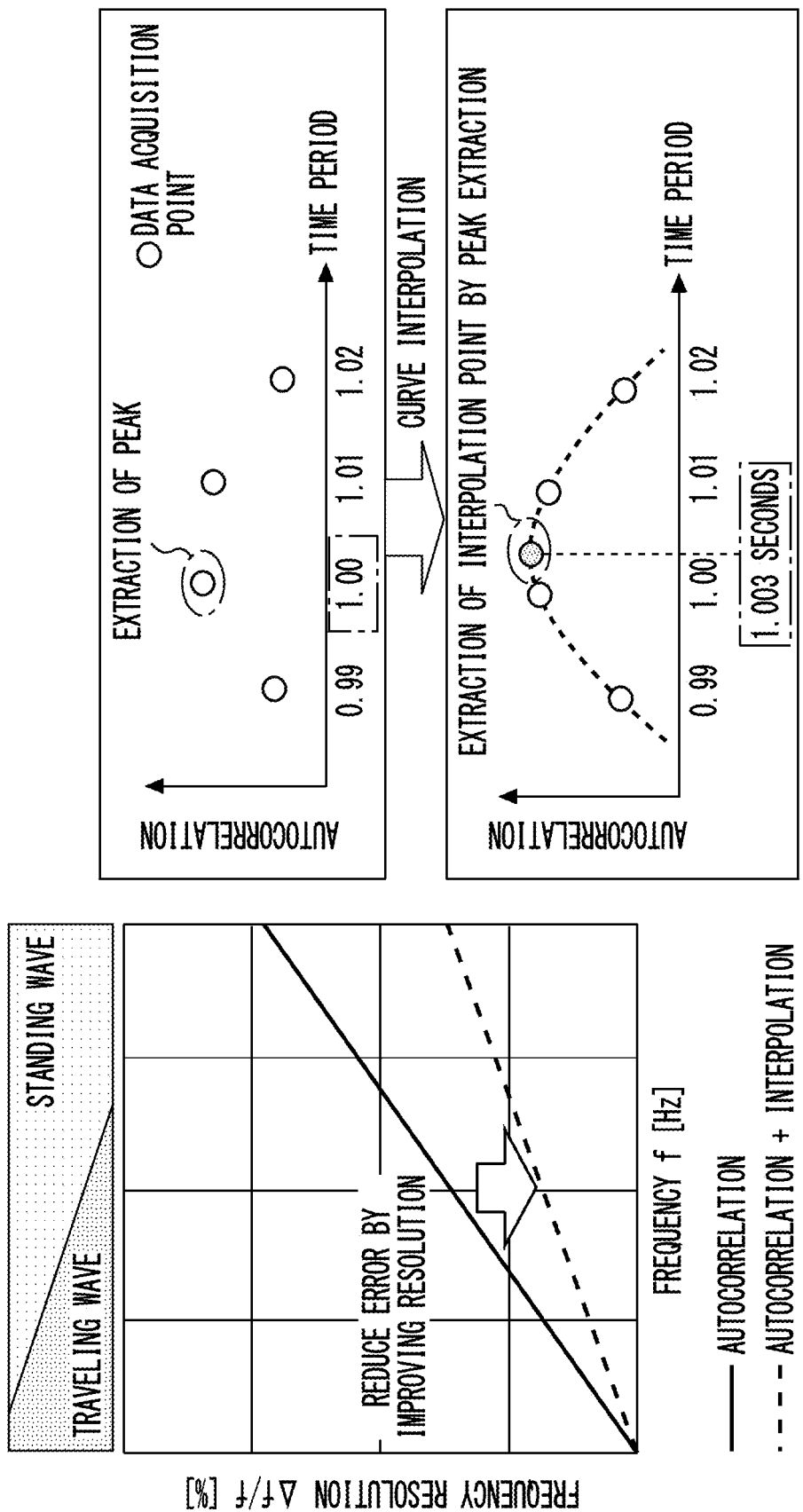
FIG. 29 is a graph for describing a curve interpolation method performed by the rope tension measurement device utilized in the elevator rope tension measurement system of the embodiment 1.

FIG. 29 is a graph for describing the curve interpolation method performed by the rope tension measurement device utilized in the elevator rope tension measurement system of the embodiment 1.

In calculating the frequency of the vibration waveform collected by the vibration waveform collection unit 18, the frequency calculation unit 21 performs numerical interpolation in the vicinity of the peak of the frequency to obtain the position of the peak.

Specifically, in calculating a frequency by using the autocorrelation function on a traveling wave, the higher frequencies cause resolution to deteriorate more, thus increasing measurement error. Therefore, the frequency calculation unit 21 reduces measurement error by increasing resolution in a pseudo manner by performing curve interpolation on the autocorrelation function.

Next, the outline of actions of the rope tension measurement device 14 will be described with reference to FIG. 30.

Figure 30:
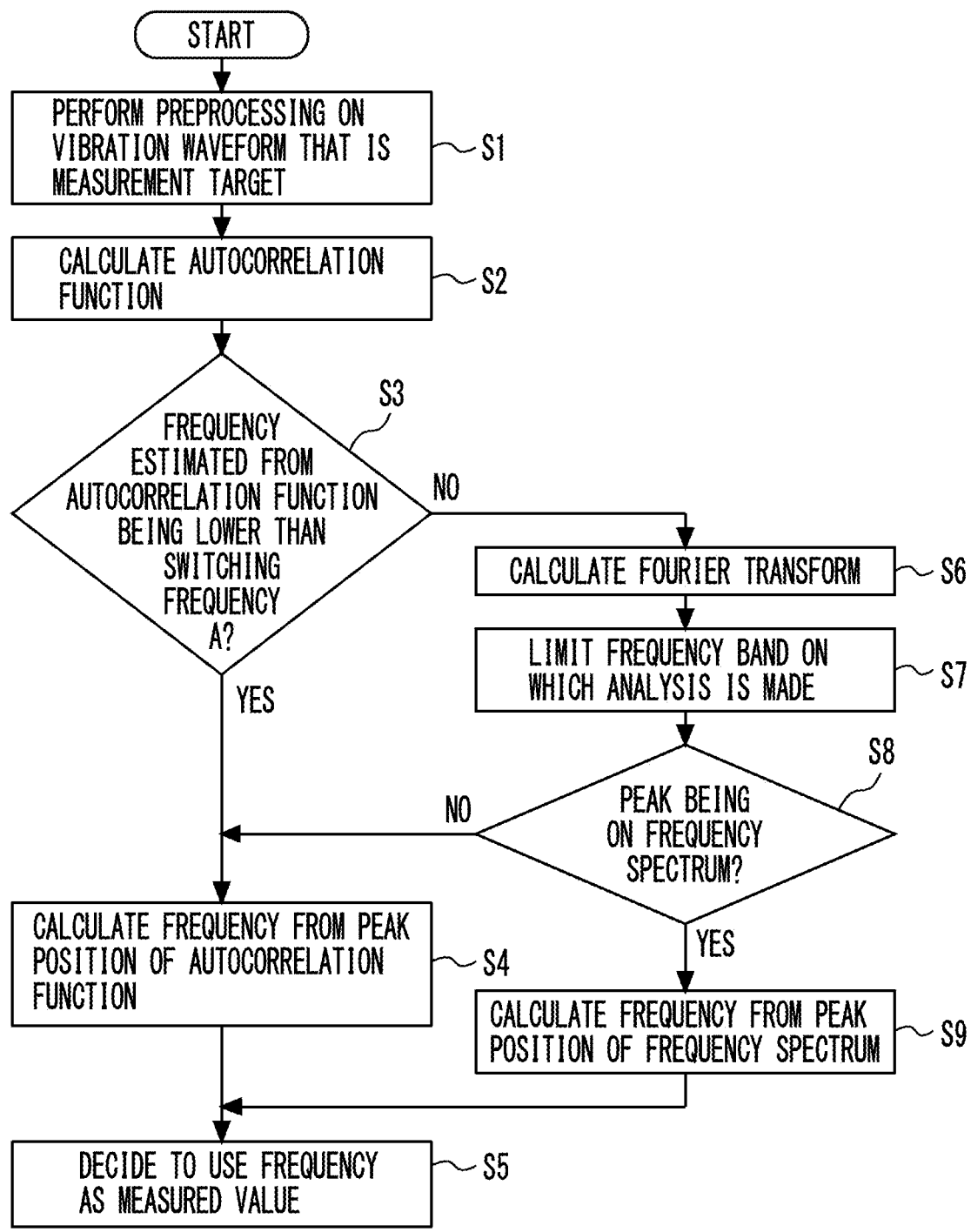
FIG. 30 is a flowchart for describing an outline of actions of the rope tension measurement device utilized in the elevator rope tension measurement system of the embodiment 1.

FIG. 30 is a flowchart for describing the outline of the actions of the rope tension measurement device utilized in the elevator rope tension measurement system of the embodiment 1.

In step S1, the rope tension measurement device 14 performs preprocessing on a vibration waveform that is a measurement target. Thereafter, the action in step S2 is performed. In step S2, the rope tension measurement device 14 calculates the autocorrelation function. Thereafter, the action in step S3 is performed. In step S3, the rope tension measurement device 14 judges whether a frequency estimated from the autocorrelation function is lower than the switching frequency A.

When the frequency estimated from the autocorrelation function is lower than the switching frequency A in step S3, the action in step S4 is performed. In step S4, the rope tension measurement device 14 calculates a frequency from the peak position of the autocorrelation function. Thereafter, the process advances to step S5. In step S5, the rope tension measurement device 14 decides to use the frequency as a measured value.

When the frequency estimated from the autocorrelation function is not lower than the switching frequency A in step S3, the action in step S6 is performed. In step S6, the rope tension measurement device 14 calculates the Fourier transform. Thereafter, the action in step S7 is performed. In step S7, based on the frequency estimated from the autocorrelation function in step S3, the rope tension measurement device 14 limits a frequency band on which an analysis is made. Thereafter, the action in step S8 is performed. In step S8, the rope tension measurement device 14 judges whether the peak is on the frequency spectrum.

When the peak is not on the frequency spectrum in step S8, the action in step S4 is performed. In step S4, a frequency is calculated from the peak position of the autocorrelation function. Thereafter, the process advances to step S5. In step S5, the rope tension measurement device 14 decides to use the frequency as a measured value.

When the peak is on the frequency spectrum in step S8, the action in step S9 is performed. In step S9, the rope tension measurement device 14 calculates a frequency from the peak position of the frequency spectrum. Thereafter, the process advances to step S5. In step S5, the rope tension measurement device 14 decides to use the frequency as a measured value.

Next, a method for adjusting the tension of the rope 6 will be described with reference to FIG. 31.

Figure 31:
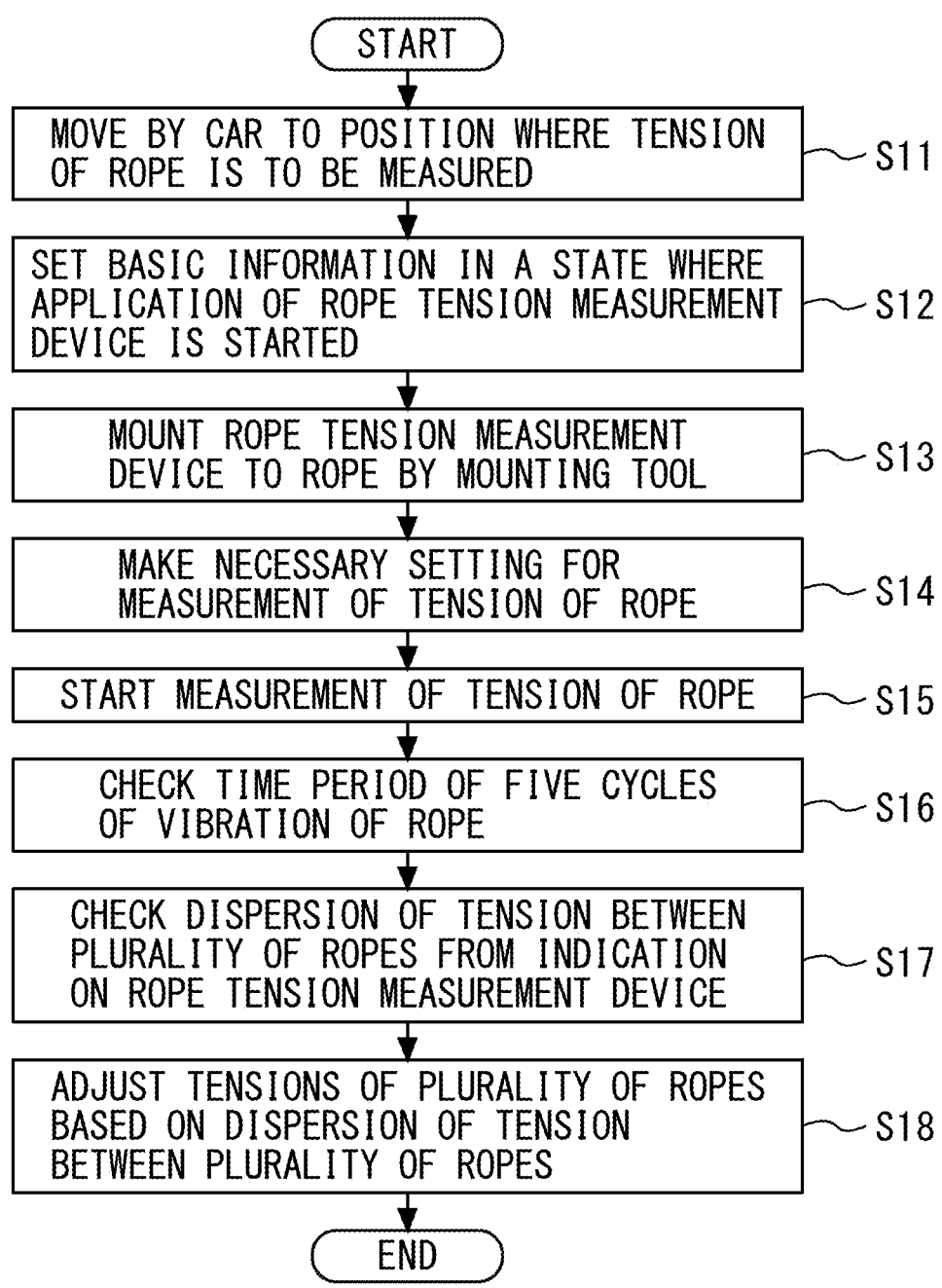
FIG. 31 is a flowchart for describing a method for adjusting the rope by utilizing the elevator rope tension measurement system of the embodiment 1.

FIG. 31 is a flowchart for describing the method for adjusting a rope by utilizing the elevator rope tension measurement system of the embodiment 1.

In step S11, a worker moves by the car 9 to a position where the tension of the rope 6 is to be measured. Thereafter, the worker performs the action in step S12. In step S12, the worker sets basic information in a state where the application of the rope tension measurement device 14 is started.

Thereafter, the worker performs the action in step S13. In step S13, the worker mounts the rope tension measurement device 14 to the rope 6 by the mounting tool 15. Thereafter, the worker performs the action in step S14. In step S14, the worker makes necessary settings for the measurement of the tension of the rope 6. Thereafter, the worker performs the action in step S15. In step S15, the worker starts the measurement of the tension of the rope 6. Thereafter, the worker performs the action in step S16. In step S16, the worker checks a time period of five cycles of the vibration of the rope 6. The actions in step S13 to step S16 are repeated by the number of times corresponding to the number of ropes 6.

In step S17, the worker checks dispersion of tension between the plurality of ropes 6 from an indication on the rope tension measurement device 14. Thereafter, the worker performs the action in step S18. In step S18, the worker adjusts the tensions of the plurality of ropes 6 based on the dispersion of tension between the plurality of ropes 6. Thereafter, the worker finishes the operation of adjusting the tensions of the plurality of ropes 6.

According to the embodiment 1 described above, the rope tension measurement device 14 selects a method for calculating the frequency of the vibration waveform of the rope 6 based on the measurement resolution calculated from the collection time period and collection cycles for collecting a vibration waveform data of the rope 6. Therefore, it is possible to reduce measurement error when the tension of the rope 6 is quantitatively measured.

The rope tension measurement device 14 calculates the frequency of the vibration waveform of the rope 6 based on the calculation results of the autocorrelation function and the Fourier transform of the vibration waveform of the rope 6. Therefore, it is possible to calculate both the frequency of a standing wave and the frequency of a traveling wave.

As a method for calculating a frequency, other method may be adopted, such as the short-time Fourier transform or the wavelet transform.

Based on information on the height of the hoistway 1 or the length of the rope 6 that is externally inputted, the rope tension measurement device 14 sets a time period for collecting the vibration waveform data of the rope 6. Therefore, it is possible to efficiently perform an operation in measuring the tension of the rope 6.

In calculating the frequency of the vibration waveform of the rope 6, the rope tension measurement device 14 performs numerical value interpolation in the vicinity of the peak of the frequency to calculate the position of the peak. Therefore, it is possible to improve resolution in calculating the frequency.

In obtaining the frequency of the vibration waveform of the rope 6 from the spectrum of the frequency calculated by the Fourier transform, the rope tension measurement device 14 searches for the peak of the spectrum of the frequency only in the vicinity of the frequency obtained from the autocorrelation function. Therefore, it is possible to prevent higher harmonics from being erroneously outputted as the measured value of the frequency.

When the rope tension measurement device 14 judges that the collection time period for collecting the vibration waveform data of the rope 6 is insufficient, the rope tension measurement device 14 does not output information on the calculated frequency. Therefore, it is possible to ensure frequency measurement accuracy particularly for a low frequency.

The rope tension measurement device 14 performs resampling processing on the vibration waveform of the rope 6. Therefore, even in the case where sampling intervals for sampling the vibration waveform of the rope 6 have dispersion, it is possible to correct the sampling intervals to equal intervals. As a result, it is possible to measure the tension of the rope 6 with high accuracy.

The rope tension measurement device 14 receives an external input operation, and indicates the calculated frequency by a character or an image. Therefore, the rope tension measurement device 14 can be intuitively operated.

The rope tension measurement device 14 stores information on the calculation results for the plurality of ropes 6 of the elevator. Therefore, it is possible to check the dispersion of tension between the plurality of ropes 6 by the rope tension measurement device 14.

The rope tension measurement device 14 extracts the ropes 6 for which the tension is outside of designated values.

Therefore, it is possible to start adjustment from the rope 6 having the largest dispersion of tension.

The rope tension measurement device 14 calculates the adjustment amount for the rope 6 for which the tension is outside of the designated values. Therefore, it is possible to easily understand a fastening amount of the shackle nut of the rope 6. As a result, it is possible to finish the adjustment of the rope 6 more quickly.

The housing unit 25 houses the vibration waveform collection unit 18, the frequency calculation unit 21, the touch panel unit 16, the storage unit 17, the extraction unit 22, and the adjustment amount calculation unit 23. Therefore, it is possible to measure the tension of the rope 6 only with the rope tension measurement device 14.

The battery unit 24 is housed in the housing unit 25. The battery unit 24 supplies power to the respective units housed in the housing unit 25. Therefore, it is unnecessary to connect a power supply line to the rope tension measurement device 14. As a result, the operation procedure in measuring the tension of the rope 6 is simplified and hence, work efficiency of the worker can be improved.

The judgement unit 20 judges whether the tension of the rope 6 can be measured based on acceleration detection accuracy. At this point of operation, it is sufficient to indicate information showing the judgement result on the touch panel unit 16, serving as an indication unit, by a character or an image. In this case, it is possible to easily understand whether the specs of the rope tension measurement device 14 are sufficient for the measurement of the tension of the rope 6.

Based on product information on the rope tension measurement device 14, information on the operating system installed in the rope tension measurement device 14, and information on the acceleration sensor serving as the acceleration detection unit, the judgement unit 20 may extract a group of model numbers of the rope tension measurement devices 14 that can be utilized in measuring the tension of the rope 6. In this case, it is possible to reduce labor necessary for selecting the rope tension measurement device 14.

The judgement unit 20 also judges whether the tension of the rope 6 can be measured based on a difference between collected acceleration and gravitational acceleration. Therefore, it is possible to more easily understand whether the specs of the measurement device are sufficient for the measurement of the tension of the rope 6.

The judgement unit 20 also judges whether the tension of the rope 6 can be measured based on the variance of collected acceleration. Therefore, it is possible to more easily understand whether dispersion of output from the vibration waveform collection unit 18 is sufficient for the measurement of the tension of the rope 6.

The judgement unit 20 also judges whether the tension of the rope 6 can be measured based on the maximum value of the absolute difference between the average values of accelerations for each time. Therefore, it is possible to more easily understand whether repeating error of the vibration waveform collection unit 18 is sufficiently small for the measurement of the tension of the rope 6.

The vibration waveform collection unit 18 calculates the component of gravitational acceleration based on an angle detected by the angle detection unit 26. Therefore, even in the case where the rope tension measurement device 14 is mounted in an arbitrary direction, it is possible to calculate accuracy of output from the vibration waveform collection unit 18.

The judgement unit 20 may judge the specs of the rope tension measurement device 14 based on the cumulative number of times of measurement of the tension of the rope 6. For example, when the cumulative number of times of use is zero and it is judged that the rope tension measurement device 14 cannot be used for the measurement of the tension of the rope 6, it is sufficient to judge that the specs of the rope tension measurement device 14 are insufficient for the measurement of the tension of the rope 6. In this case, it is possible to more easily understand whether the specs of the rope tension measurement device 14 are sufficient for the measurement of the tension of the rope 6.

The storage device 27 receives, from the rope tension measurement device 14, product information from which the acceleration detection unit can be identified and information on the spec judgement result. Then, the storage device 27 stores the product information and the information on the spec judgement result in an associated manner. Therefore, it is possible to automatically obtain a table showing a group of models of the rope tension measurement devices 14 with specs that can be utilized for the measurement of the tension of the rope 6.

The judgement unit 20 may judge whether the tension of the rope 6 can be measured based on a combination of the difference between acceleration and gravitational acceleration for each time, the variance of acceleration for each time, and the maximum value of the absolute difference between the average values of accelerations for each time. In this case, it is possible to more accurately understand whether the specs of the measurement device are sufficient for the measurement of the tension of the rope 6.

In the mounting tool 15, the connecting body 30 connects the first holding body 28 with the second holding body 29 in such a manner that the rope tension measurement device 14 is disposed at a position away from the rope 6. Therefore, it is possible to prevent the rope tension measurement device 14 from interfering with the rope 6 disposed adjacently to the rope 6 that is the measurement target. As a result, it is possible to utilize a mobile terminal, such as an existing smartphone, as the rope tension measurement device 14.

In the mounting tool 15, the second holding body 29 holds the rope tension measurement device 14 in such a manner that the detection direction of vibration detected by the rope tension measurement device 14 is aligned with the vibration direction of the rope 6. Therefore, it is possible to measure the vibration of the rope 6 with high accuracy.

In the mounting tool 15, the product of a distance between positions where the pair of holding parts 28*a* hold the rope 6 and a holding force of the upper first holding part 28*a* for holding the rope 6 is greater than the rotational moment by the dead load of the rope tension measurement device 14. Therefore, it is possible to prevent the rope tension measurement device 14 from falling due to the rotational moment.

In the mounting tool 15, the connecting body 30 connects the first holding body 28 with the second holding body 29 in such a manner that, when the first holding body 28 holds one of the rope 6 on the front side or the rope 6 on the back side, the rope tension measurement device 14 is disposed on a side opposite to the one of the rope 6 on the front side or the rope 6 on the back side with respect to the other of the rope 6 on the front side or the rope 6 on the back side. Therefore, it is possible to prevent the mounting tool 15 from interfering with the rope 6.

In the mounting tool 15, one side of the first fall preventing body 31*a* is connected to the connecting body 30. The other side of the first fall preventing body 31*a* is mounted to the rope 6 at a position higher than the rope tension measurement device 14. Therefore, it is possible to prevent the rope tension measurement device 14 from falling.

In the mounting tool 15, the first holding body 28 is a clip. Therefore, the mounting tool 15 can be easily mounted to or removed from the rope 6 with one hand. Further, when the first holding body 28 is damaged, the first holding body 28 can be easily replaced. It is sufficient to select the first holding body 28 corresponding to the outer diameter of the rope 6. Specifically, it is sufficient to select a clip having a curvature conforming to the outer diameter of the rope 6. In this case, the first holding body 28 holds the rope 6 with certainty. As a result, it is possible to prevent the rope tension measurement device 14 from being displaced or falling.

In the mounting tool 15, the first holding body 28 is a clip having a plurality of curvatures respectively conforming to the outer diameters of the plurality of ropes 6. In such a case, it is sufficient to hold the rope 6 by the holding surface with an appropriate curvature corresponding to the outer diameter of the rope 6. In this case, even if the first holding body 28 is not replaced corresponding to the outer diameter of the rope 6, it is possible to prevent the rope tension measurement device 14 from being displaced or falling. The curvature is caused to have a range of values and hence, the first holding body 28 can handle the ropes 6 with various diameters.

In the mounting tool 15, the first holding body 28 includes uneven-shaped tips that fit to unevenness on the outer periphery of the rope 6. Therefore, the first holding body 28 can stably hold the rope 6 and hence, it is possible to prevent the mounting tool 15 from rotating with respect to the rope 6.

In the mounting tool 15, the first holding body 28 includes an inner surface portion having protrusions that fit to unevenness on the outer periphery of the rope 6. Therefore, the first holding body 28 can stably hold the rope 6 and hence, it is possible to prevent the mounting tool 15 from rotating with respect to the rope 6.

In the mounting tool 15, the first holding body 28 is formed of a wire member or a plate member having a recess conforming to the outer diameter of the rope 6. Therefore, it is possible to reduce the weight of the mounting tool 15. Further, the mounting tool 15 can be easily mounted on or removed from the rope 6.

In the mounting tool 15, the connecting body 30 has a natural frequency higher than the frequency of the rope 6. Therefore, it is possible to prevent resonance of the rope tension measurement device 14. As a result, it is possible to reduce measurement error of the tension of the rope 6.

In the mounting tool 15, one side of the connecting body 30 is connected with one side of the second holding body 29. The connecting body 30 is orthogonal to the second holding body 29. Therefore, the rope tension measurement device 14 is disposed on the one side of the connecting body 30. Therefore, even in the case where the mounting tool 15 is mounted to the rope 6 disposed adjacently to the wall of the hoistway 1, it is possible to prevent the rope tension measurement device 14 from interfering with the wall of the hoistway 1. In such a case, when the mounting tool 15 is used in a state of being vertically inverted according to the positional relationship between the rope 6 and the wall of the hoistway 1, the mounting tool 15 can handle both the case where the wall of the hoistway 1 is disposed adjacently to the left side of the rope 6 and the case where the wall of the hoistway 1 is disposed adjacently to the right side of the rope 6.

In the mounting tool 15, the first holding part 29a is provided in such a manner that the first holding part 29a can be moved in the horizontal direction. The first holding part 29a holds the rope tension measurement device 14 from the side. The second holding part 29b generates a load in the horizontal direction so as to apply a force of holding the rope tension measurement device 14 to the first holding part 29a. Therefore, it is possible to hold the rope tension measurement device 14 with certainty regardless of the size of the rope tension measurement device 14. As a result, even in the case where a mobile terminal, such as an existing smartphone, is utilized as the rope tension measurement device 14, it is possible to hold the mobile terminal with certainty regardless of the kinds of the mobile terminal.

Figure 32:
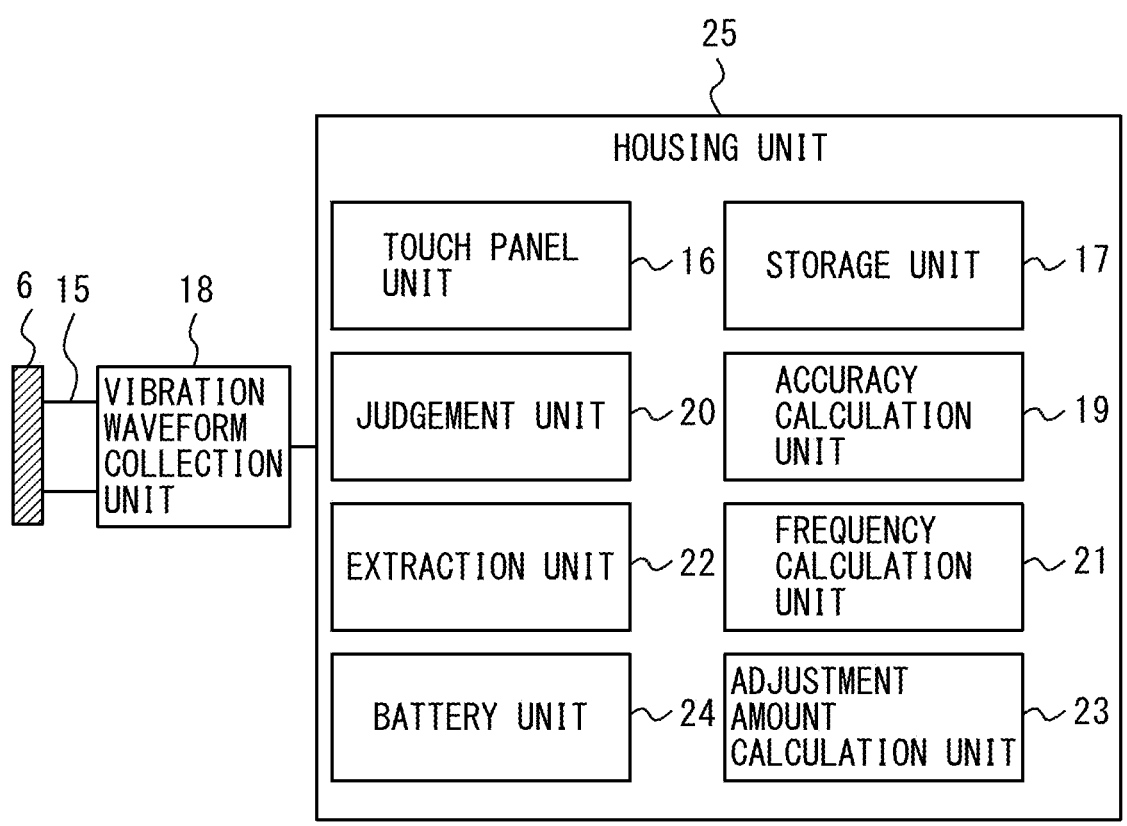
FIG. 32 is a block diagram showing a modification of the elevator rope tension measurement system of the embodiment 1.

In the embodiment 1, as shown in FIG. 32, a configuration may be adopted where, in the rope tension measurement device 14, the vibration waveform collection unit 18 is not housed in the housing unit 25. The housing unit 25 is connected with the vibration waveform collection unit 18 via a communication cable or the like, the housing unit 25 housing the touch panel unit 16, the storage unit 17, the accuracy calculation unit 19, the judgement unit 20, the frequency calculation unit 21, the extraction unit 22, the adjustment amount calculation unit 23, and the battery unit 24. Therefore, power can be supplied to and obtained waveforms can be communicated to the vibration waveform collection unit 18, for example.

Next, an example of the control device 11 will be described with reference to FIG. 33.

Figure 33:
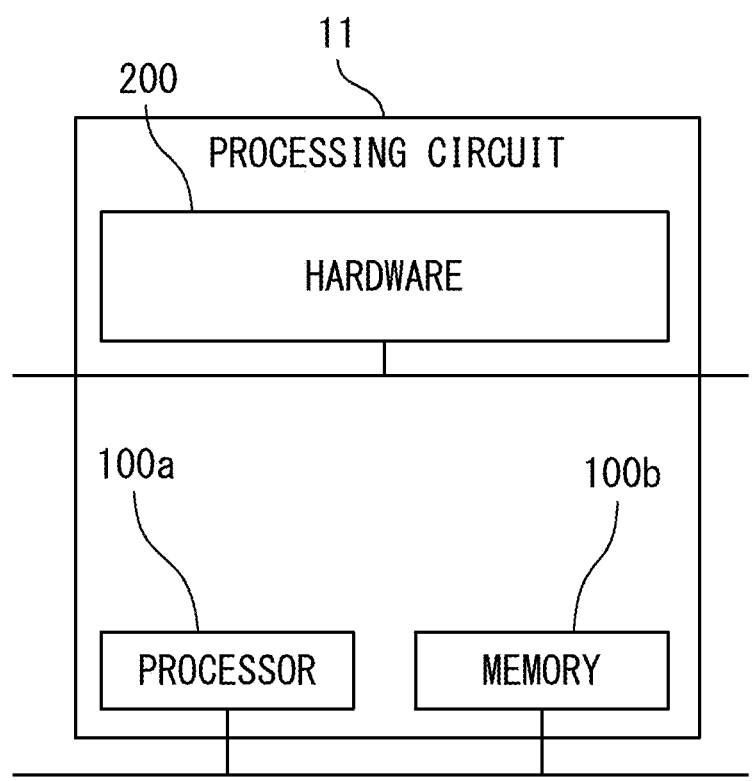
FIG. 33 is a configuration diagram of hardware of a control device of the elevator system in which the elevator rope tension measurement system of the embodiment 1 is used.

FIG. 33 is a configuration diagram of hardware of the control device of the elevator system in which the elevator rope tension measurement system of the embodiment 1 is used.

The respective functions of the control device 11 may be achieved by a processing circuitry. For example, the processing circuitry includes at least one processor 100a and at least one memory 100b. For example, the processing circuitry includes at least one dedicated hardware 200.

In the case where the processing circuitry includes at least one processor 100a and at least one memory 100b, the respective functions of the control device 11 are achieved by software, firmware, or a combination of the software and the firmware. At least one of the software and the firmware is referred to as a program. At least one of the software and the firmware is stored in at least one memory 100b. At least one processor 100a reads and executes the program stored in at least one memory 100b to achieve the respective functions of the control device 11. At least one processor 100a is also referred to as a central processing unit, a processing unit, an arithmetic unit, a microprocessor, a microcomputer, or a DSP. For example, at least one memory 100b may be a nonvolatile or volatile semiconductor memory, such as a RAM, a ROM, a flash memory, an EPROM, or an EEPROM, or may be a magnetic disk, a flexible disk, an optical disc, a compact disc, a mini disc, a DVD or the like.

In the case where the processing circuitry includes at least one dedicated hardware 200, the processing circuitry may be achieved by, for example, a single circuit, a composite circuitry, a programmed processor, a parallel programmed processor, an ASIC, an FPGA, or a combination of the above. For example, the respective functions of the control device 11 may be each achieved by a piece of processing circuitry. For example, the respective functions of the control device 11 may be collectively achieved by the processing circuitry.

Some of the respective functions of the control device 11 may be achieved by the dedicated hardware 200, and other functions may be achieved by the software or the firmware. For example, the function of a control unit 9b may be achieved by the processing circuitry formed of the dedicated hardware 200, and functions other than the function of the control unit 9b may be achieved by at least one processor 100a reading and executing the program stored in at least one memory 100b.

As described above, the processing circuitry achieves the respective functions of the control device 11 by the hardware 200, the software, the firmware, or a combination of the above.

Although not shown in the drawing, the respective functions of the monitoring device 12 are also achieved by a processing circuitry equivalent to the processing circuitry which achieves the respective functions of the control device 11. The respective functions of the information center device 13 are also achieved by a processing circuitry equivalent to the processing circuitry which achieves the respective functions of the control device 11.

Embodiment 2

Figure 34:
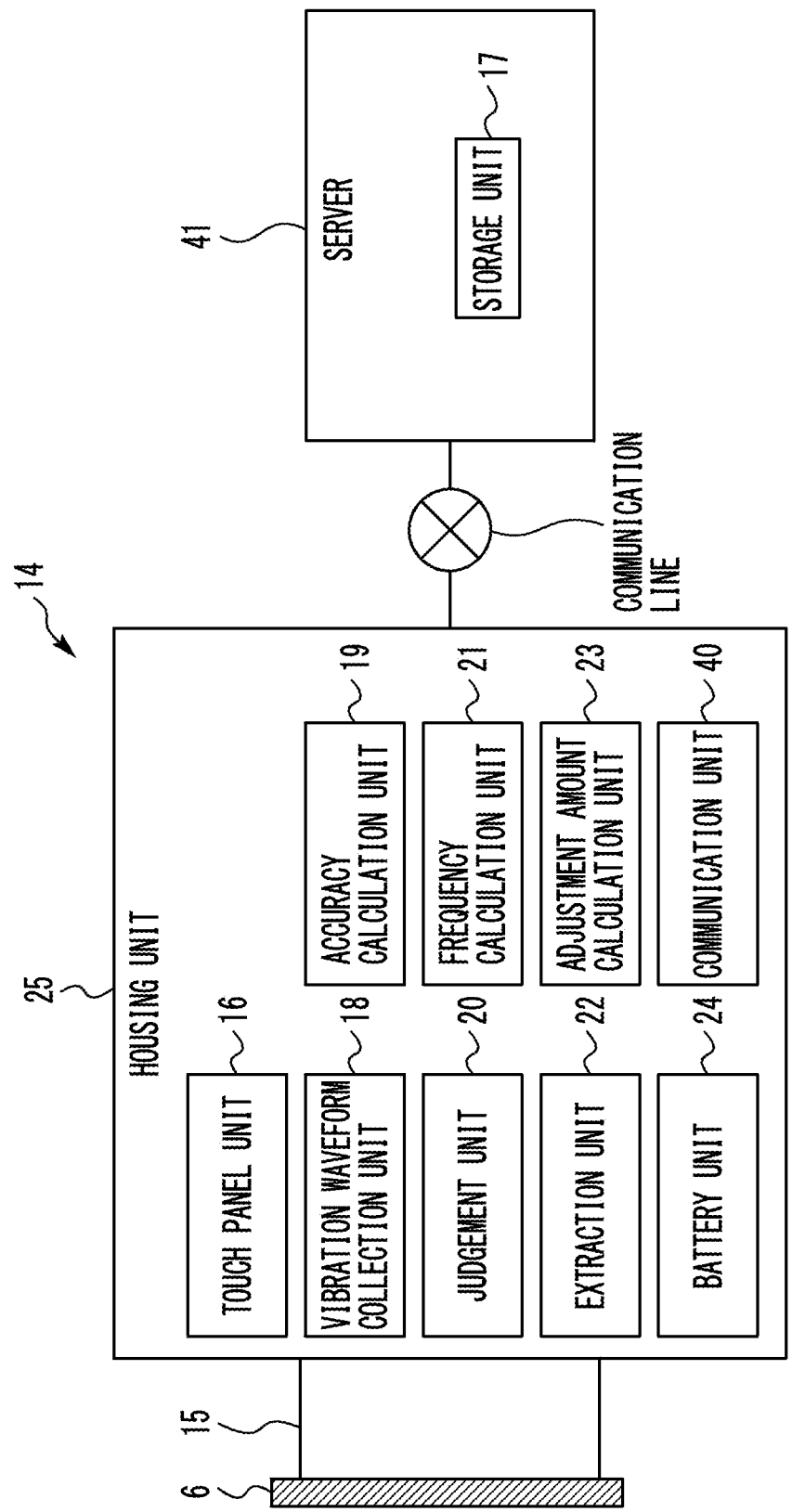
FIG. 34 is a block diagram of an elevator rope tension measurement system of an embodiment 2.

FIG. 34 is a block diagram of an elevator rope tension measurement system of an embodiment 2. Components identical or corresponding to the components in the embodiment 1 are given the same reference symbols. The description of such components will be omitted.

Figure 35:
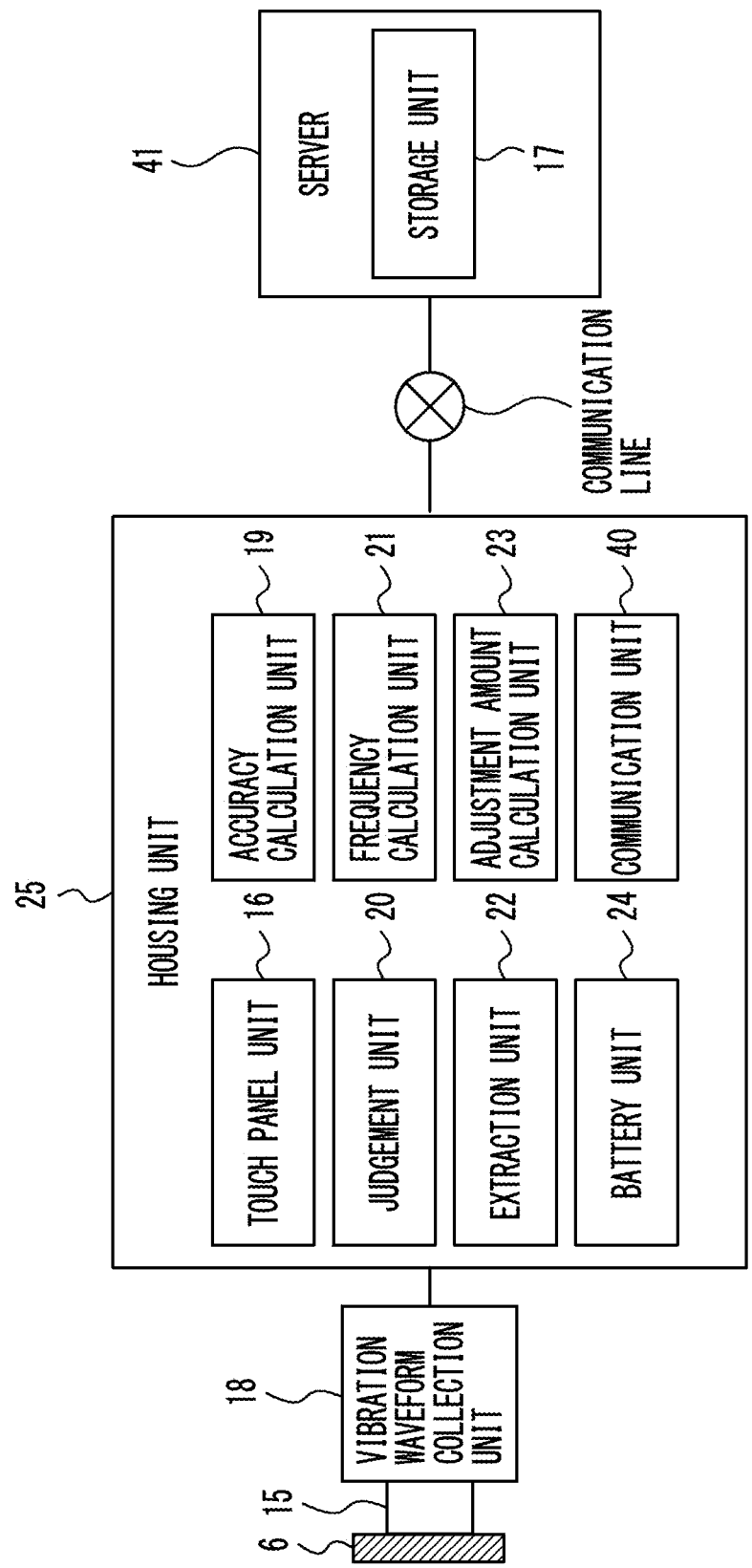
FIG. 35 is a block diagram showing a modification of the elevator rope tension measurement system of the embodiment 2.

In the embodiment 2, the rope tension measurement device 14 includes a communication unit 40. The communication unit 40 is provided in such a manner that the communication unit 40 can communicate with external equipment. As shown in FIG. 35, the rope tension measurement device 14 may be configured such that the vibration waveform collection unit 18 is not housed in the housing unit 25. Specifically, a structure may be adopted where the vibration waveform collection unit 18 is mounted to the rope 6 via the mounting tool 15. The vibration waveform collection unit 18 is connected with the housing unit 25 via a communication cable or the like, the housing unit 25 including the touch panel unit 16, the accuracy calculation unit 19, the judgement unit 20, the frequency calculation unit 21, the extraction unit 22, the adjustment amount calculation unit 23, the battery unit 24, and the communication unit 40. Therefore, power can be supplied to and obtained waveforms can be communicated to the vibration waveform collection unit 18, for example.

A server 41 is provided to the maintenance company or the like for the elevator. The server 41 houses the storage unit 17. The storage unit 17 has a function substantially equal to the function of the storage unit 17 in the embodiment 1.

The rope tension measurement device 14 performs communication with the server 41 via the communication unit 40.

According to the embodiment 2 described above, the server 41 houses the storage unit 17. Each time the rope tension measurement device 14 measures the tension of the rope 6, the storage unit 17 stores the tension measurement result. At this point of operation, if information on the tension measurement result is stored in a state of being associated with measurement time information, it is possible to check the history of dispersion of tension.

Embodiment 3

Figure 36:
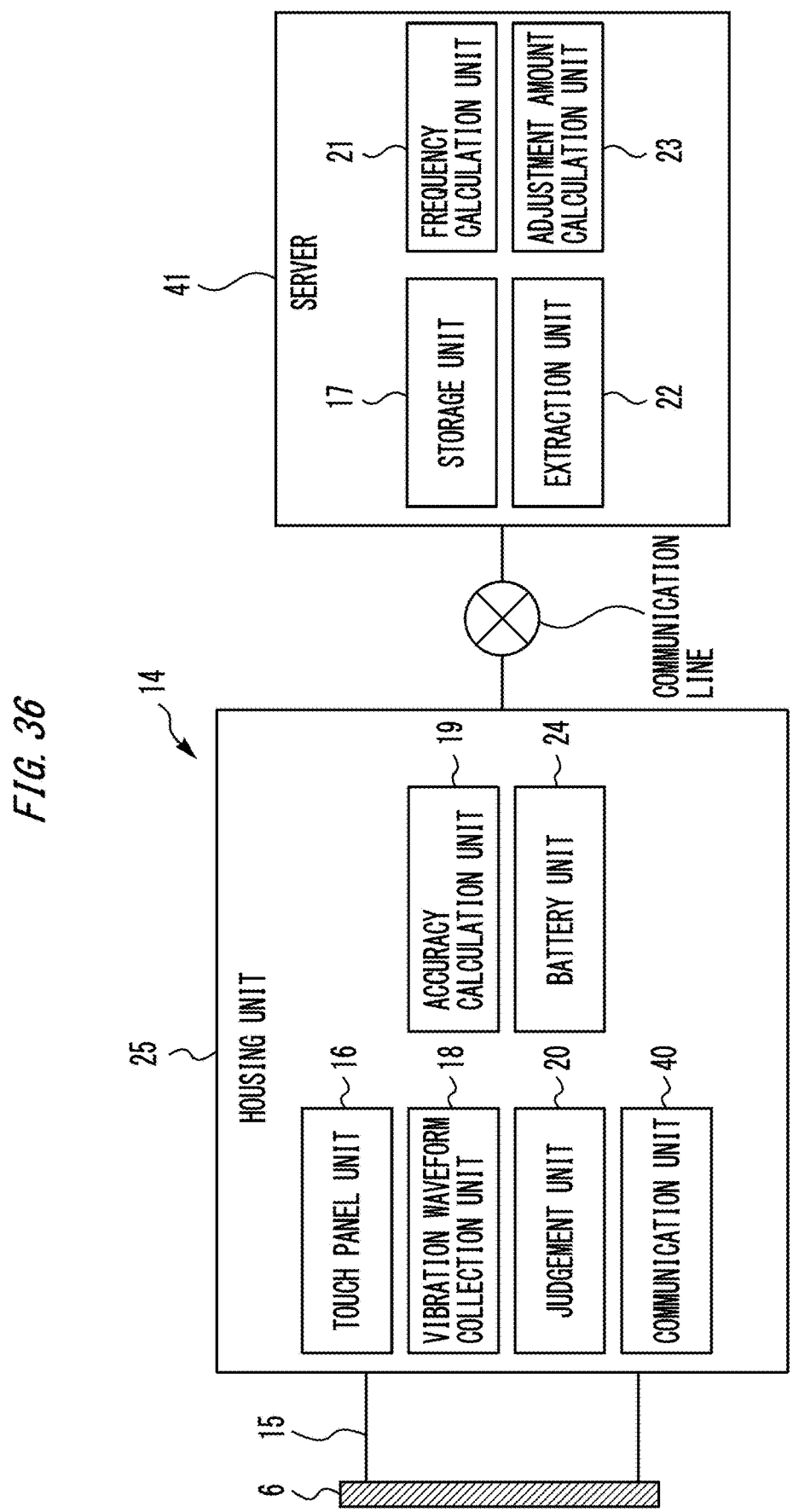
FIG. 36 is a block diagram of an elevator rope tension measurement system of an embodiment 3.

FIG. 36 is a block diagram of an elevator rope tension measurement system of an embodiment 3. Components identical or corresponding to the components in the embodiment 2 are given the same reference symbols. The description of such components will be omitted.

Figure 37:
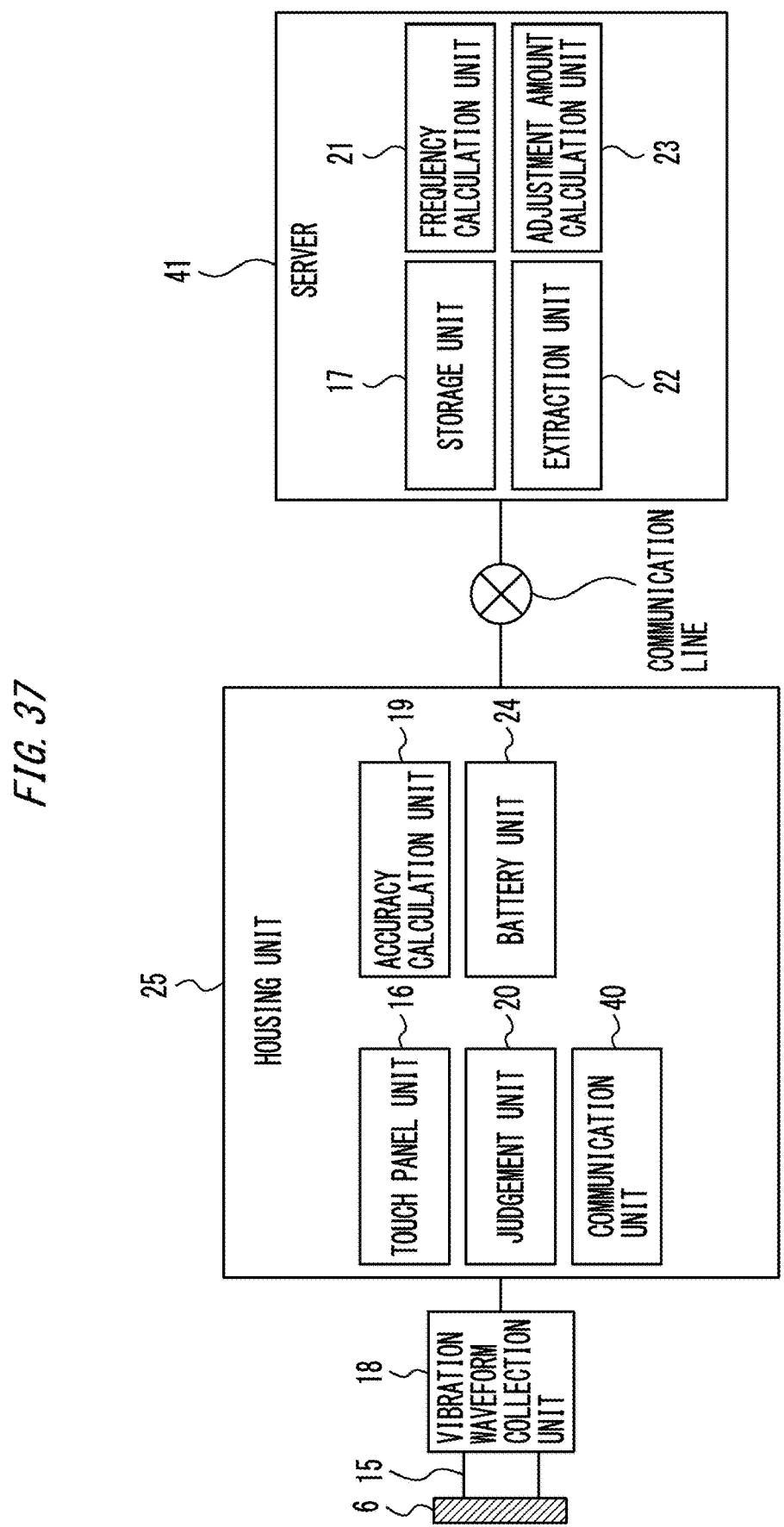
FIG. 37 is a block diagram showing a modification of the elevator rope tension measurement system of the embodiment 3.

In the embodiment 3, the server 41 houses the frequency calculation unit 21, the extraction unit 22, and the adjustment amount calculation unit 23. The frequency calculation unit 21, the extraction unit 22, and the adjustment amount calculation unit 23 have functions substantially equal to the functions of the frequency calculation unit 21, the extraction unit 22, and the adjustment amount calculation unit 23 in the embodiment 2. Further, as shown in FIG. 37, the rope tension measurement device 14 may be configured such that the vibration waveform collection unit 18 is not housed in the housing unit 25. Specifically, a structure may be adopted where the vibration waveform collection unit 18 is mounted to the rope 6 via the mounting tool 15. The vibration waveform collection unit 18 is connected with the housing unit 25 via a communication cable or the like, the housing unit 25 including the touch panel unit 16, the battery unit 24, and the communication unit 40. Therefore, power can be supplied to and obtained waveforms can be communicated to the vibration waveform collection unit 18, for example.

The rope tension measurement device 14 performs communication with the server 41 via the communication unit 40.

According to the embodiment 3 described above, the server 41 houses the frequency calculation unit 21, the storage unit 17, the extraction unit 22, and the adjustment amount calculation unit 23. Therefore, it is possible to prevent leakage of measurement results for respective premises or algorithms used for analyzing frequencies. Further, when the threshold of an algorithm is changed or updated or a judgement standard is changed, it is unnecessary to update an app in a terminal and hence, updates can be easily made.

Embodiment 4

Figure 38:
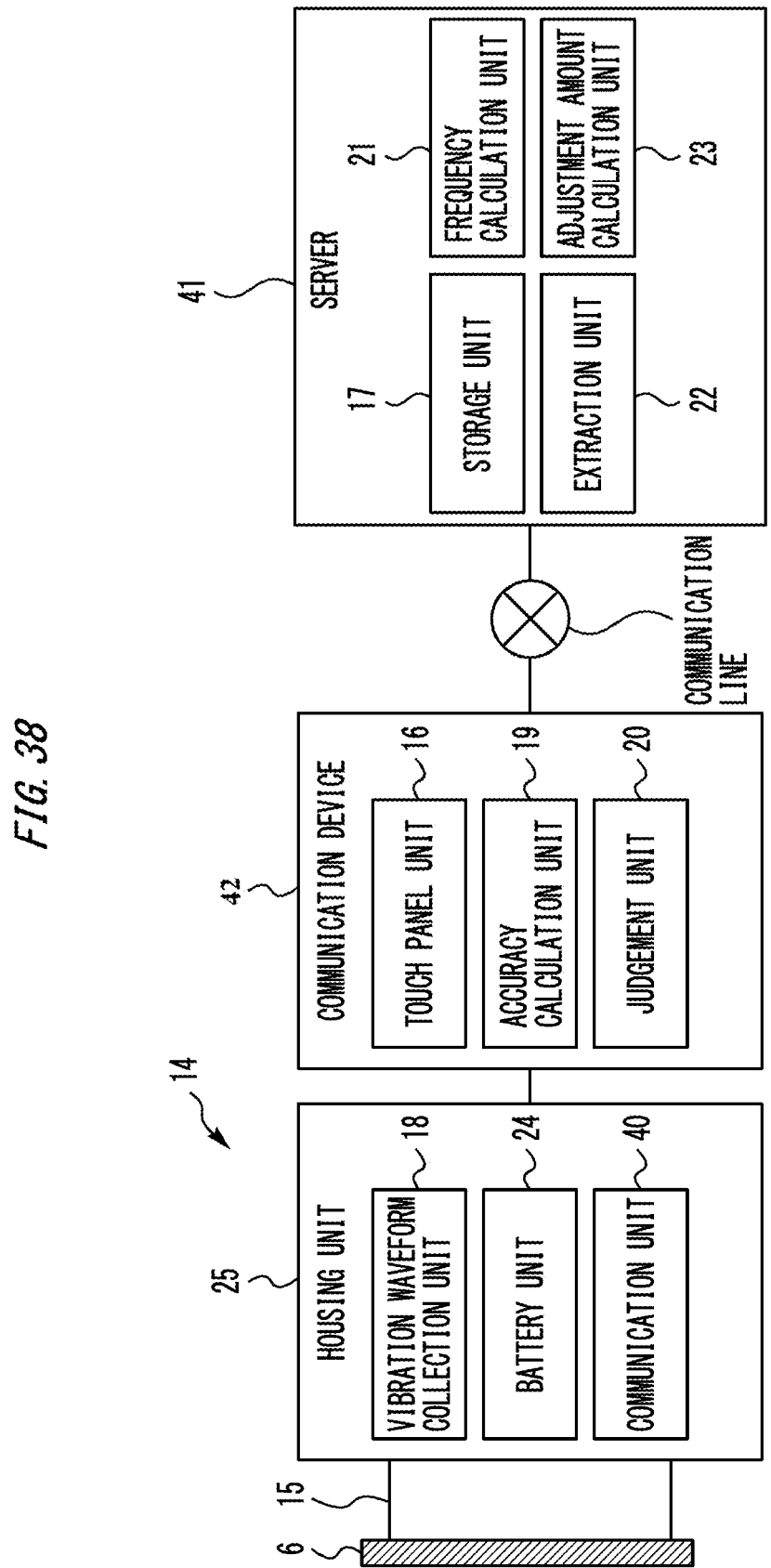
FIG. 38 is a block diagram of an elevator rope tension measurement system of an embodiment 4.

FIG. 38 is a block diagram of an elevator rope tension measurement system of an embodiment 4. Components identical or corresponding to the components in the embodiment 3 are given the same reference symbols. The description of such components will be omitted.

In the embodiment 4, a communication device 42 houses the touch panel unit 16 and the communication unit 40. The touch panel unit 16 and the communication unit 40 have functions substantially equal to the functions of the touch panel unit 16 and the communication unit 40 in the embodiment 3.

The rope tension measurement device 14 performs communication with the communication device 42 via the communication unit 40. The communication device 42 performs communication with the server 41 via a communication line.

Figure 39:
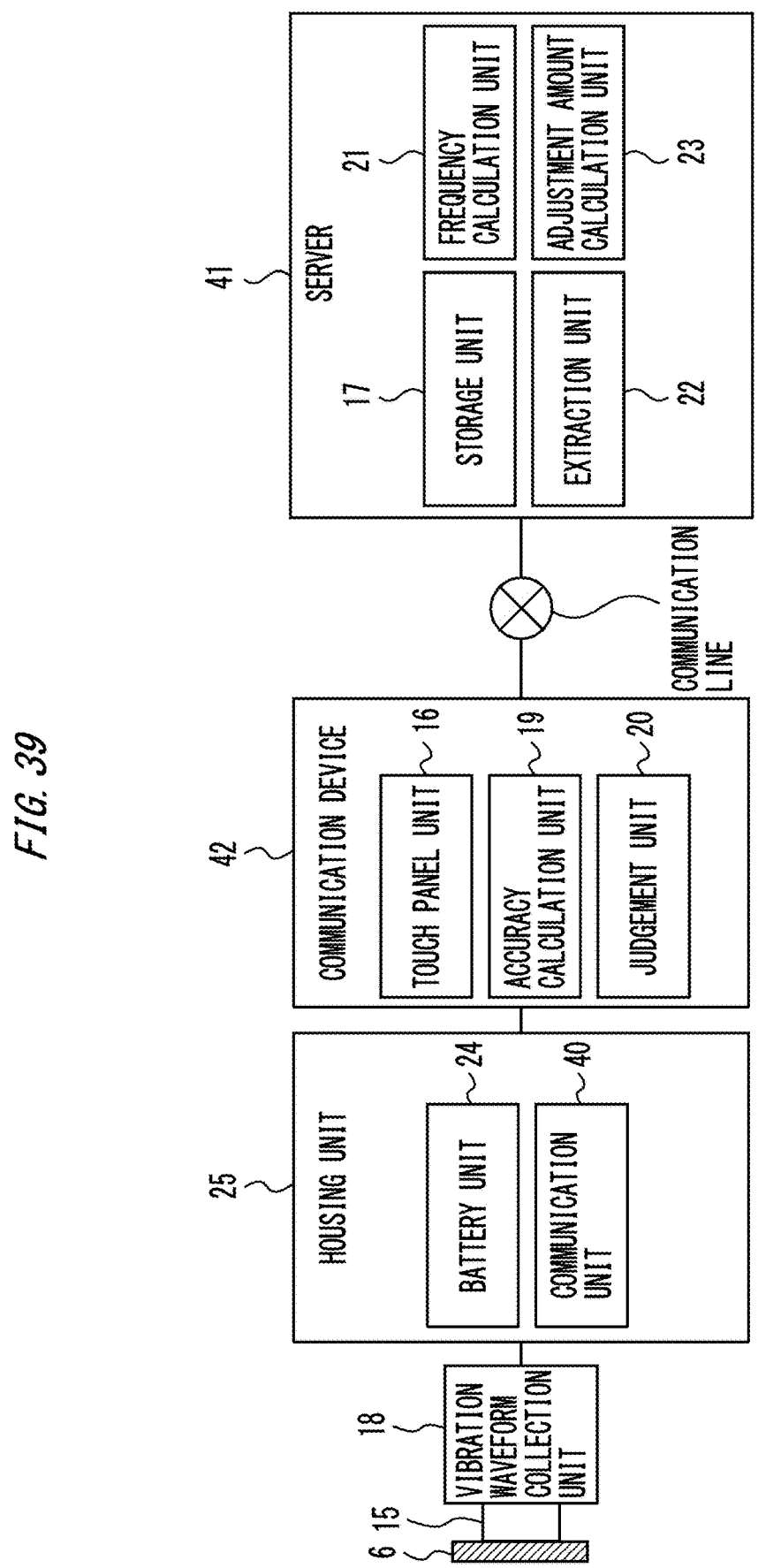
FIG. 39 is a block diagram showing a modification of the elevator rope tension measurement system of the embodiment 4.

According to the embodiment 4 described above, the housing unit 25 houses the vibration waveform collection unit 18 and the communication unit 40. The communication device 42 houses the touch panel unit 16 and the communication unit 40. Therefore, by selling the vibration waveform collection unit 18 and the mounting tool 15 as an integral body, the rope tension measurement device 14 can be manufactured at a low cost. Further, as shown in FIG. 39, a configuration may be adopted where the vibration waveform collection unit 18 is not housed in the housing unit 25. Specifically, a structure may be adopted where the vibration waveform collection unit 18 is mounted to the rope 6 via the mounting tool 15. The vibration waveform collection unit 18 is connected with the housing unit 25 via a communication cable or the like, the housing unit 25 including the battery unit 24 and the communication unit 40. Therefore, power can be supplied to and obtained waveforms can be communicated to the vibration waveform collection unit 18, for example.

In the embodiment 1 to the embodiment 4, a photographing unit and an image processing unit may be provided as the vibration waveform collection unit 18. When such a configuration is adopted, it is sufficient to photograph a vibrating state of the rope 6 with the photographing unit, such as a camera, and to perform processing, by the image processing unit, on an image photographed with the photographing unit. In this case, it is possible to collect a vibration waveform data in a non-contact manner with the rope 6.

In the embodiment 1 to the embodiment 4, a sound, a displacement gauge, a velocimeter, a magnetic sensor or the like may be used as the vibration waveform collection unit 18. In this case, compared with the case where the rope 6 is photographed with a camera from a distant position, it is possible to easily perceive the rope 6 that is the measurement target.

In the embodiment 1 to the embodiment 4, arrangement of the traction machine 3, the control device 11, and the monitoring device 12 is not limited. For example, the traction machine 3, the control device 11, and the monitoring device 12 may be disposed at the upper portion of the hoistway 1. For example, the traction machine 3, the control device 11, and the monitoring device 12 may be disposed in a machine room provided immediately above the hoistway 1.

In the embodiment 1 to the embodiment 4, the roping system of the rope 6 is not limited. For example, the mounting tool 15 may be utilized for the rope 6 which adopts a 2:1 roping system, a 1:1 roping system, or other roping systems.

The rope tension measurement system of the embodiment 1 to the embodiment 4 may be utilized in measuring vibrations of a building facility other than an elevator. For example, the rope tension measurement device 14 of the rope tension measurement system of the embodiment 1 to the embodiment 4 may be utilized as a vibration measurement device for a building facility in measuring vibrations of an escalator. For example, the rope tension measurement device 14 of the rope tension measurement system of the embodiment 1 to the embodiment 4 may be utilized as a vibration measurement device for a building facility in measuring vibrations of a moving walk. For example, the rope tension measurement device 14 of the rope tension measurement system of the embodiment 1 to the embodiment 4 may be utilized as a vibration measurement device for a building facility in measuring vibrations of an air conditioner.

INDUSTRIAL APPLICABILITY

As described above, the mounting tool for the elevator rope tension measurement device of the present disclosure can be utilized in an elevator system.

REFERENCE SIGNS LIST 1 hoistway, 2 hall, 3 traction machine, 4 car-side return sheaves, 5 counterweight-side return sheave, 6 rope, 7 car-side suspension sheave, 8 counterweight-side suspension sheave, 9 car, 10 counterweight, 11 control device, 12 monitoring device, 13 information center device, 14 rope tension measurement device, 15 mounting tool, 16 touch panel unit, 17 storage unit, 18 vibration waveform collection unit, 19 accuracy calculation unit, 20 judgement unit, 21 frequency calculation unit, 22 extraction unit, 23 adjustment amount calculation unit, 24 battery unit, 25 housing unit, 26 angle detection unit, 27 storage device, 28 first holding body, 28a holding part, 29 second holding body, 29a first holding part, 29b second holding part, 30 connecting body, 30a first mounting hole, 30b second mounting hole, 30c first divided part, 30d second divided part, 31a first fall preventing body, 31b second fall preventing body, 32 protruding part, 33 holding piece, 34 connecting piece, 35 rotary body, 36 light shielding body, 37 angle adjustment body, 38 rotation preventing body, 39 third fall preventing body, 40 communication unit, 41 server, 42 communication device, 100a processor, 100b memory, 200 hardware

The invention claimed is:

1. A mounting tool for an elevator rope tension measurement device, the mounting tool comprising:
    a first holding body configured to hold a rope in a first row of an elevator having a plurality of ropes arranged in the first row and a second row;
    a second holding body configured to hold a rope tension measurement device that measures a tension of the rope; and
    a connecting body configured to connect the first holding body with the second holding body so as to dispose the rope tension measurement device at a position away from the rope,
    wherein the connecting body connects the first holding body with the second holding body such that, in a state where the first holding body holds the rope in the first row, the rope tension measurement device is disposed on a side of the ropes in the second row that is opposite to the ropes in the first row, and
    the first holding body holds the rope by a pair of holding parts arranged in a row in a vertical direction, and a product of a distance between positions where the pair of holding parts hold the rope and a holding force of an upper holding part for holding the rope is greater than a rotational moment by a dead load of the rope tension measurement device.

2. The mounting tool for an elevator rope tension measurement device according to claim 1, wherein the second holding body holds the rope tension measurement device such that a direction in which a vibration is detected by the rope tension measurement device matches a direction of a vibration of the rope.

3. The mounting tool for an elevator rope tension measurement device according to claim 1, comprising a first fall preventing body having one side connected to the connecting body and having another side mounted, at a position higher than the rope tension measurement device, to an adjacent rope other than a rope on which a measurement is to be made or to a structural body of an elevator.

4. The mounting tool for an elevator rope tension measurement device according to claim 1, comprising a second fall preventing body having one side connected to the connecting body and having another side mounted to the rope tension measurement device.

5. The mounting tool for an elevator rope tension measurement device according to claim 1, wherein the first holding body is a clip having a curvature conforming to an outer diameter of the rope.

6. The mounting tool for an elevator rope tension measurement device according to claim 5, wherein the first holding body is the clip having a plurality of curvatures respectively conforming to outer diameters of a plurality of ropes.

7. The mounting tool for an elevator rope tension measurement device according to claim 1, wherein the connecting body has a natural frequency greater than a frequency of the rope.

8. The mounting tool for an elevator rope tension measurement device according to claim 1, wherein the connecting body has one side connected to one side of the second holding body, and is orthogonal to the second holding body.

9. The mounting tool for an elevator rope tension measurement device according to claim 1, wherein the second holding body includes
    a first holding part configured to hold the rope tension measurement device from a side, and
    a second holding part configured to generate a load in the horizontal direction so as to apply a force of holding the rope tension measurement device to the first holding part.

10. A mounting tool for an elevator rope tension measurement device, the mounting tool comprising:
    a first holding body configured to hold a rope of an elevator;
    a second holding body configured to hold a rope tension measurement device that measures a tension of the rope; and
    a connecting body configured to connect the first holding body with the second holding body so as to dispose the rope tension measurement device at a position away from the rope,
    wherein the first holding body includes an uneven-shaped tip that fits to unevenness on an outer periphery of the rope, the uneven-shaped tip including an edge having alternating long and short portions, and the long portions are longer than the short portions in a direction of an outer surface of the uneven-shaped tip.

11. The mounting tool for an elevator rope tension measurement device according to claim 10, wherein the connecting body has a natural frequency higher than a frequency of the rope.

12. The mounting tool for an elevator rope tension measurement device according to claim 10, wherein the connecting body has one side connected to one side of the second holding body, and is orthogonal to the second holding body.

13. The mounting tool for an elevator rope tension measurement device according to claim 10, wherein the second holding body includes
    a first holding part configured to hold the rope tension measurement device from a side, and
    a second holding part configured to generate a load in the horizontal direction so as to apply a force of holding the rope tension measurement device to the first holding part.

* * * * *